United States Patent [19]

Onweller

[11] Patent Number: 5,907,610
[45] Date of Patent: May 25, 1999

[54] NETWORKED TELEPHONY CENTRAL OFFICES

[75] Inventor: Arthur E. Onweller, Evergreen, Colo.

[73] Assignee: U S West, Inc., Denver, Colo.

[21] Appl. No.: 09/052,892

[22] Filed: Mar. 31, 1998

Related U.S. Application Data

[63] Continuation of application No. 08/585,347, Jan. 11, 1996, Pat. No. 5,764,756.

[51] Int. Cl.⁶ .......................... H04M 3/00; H04M 1/24; H04M 3/08; H04M 3/22

[52] U.S. Cl. .................. 379/242; 370/352; 370/401; 370/405; 370/410; 379/1; 379/12; 379/15

[58] Field of Search ........................... 370/349, 352, 370/370, 399, 401, 402, 405, 407, 408, 409, 410, 431, 522; 379/1, 6, 10, 12, 15, 22, 26, 27, 30, 32, 33, 242

[56] References Cited

U.S. PATENT DOCUMENTS

| | | | |
|---|---|---|---|
| 4,700,340 | 10/1987 | Beranek et al. | 370/218 |
| 5,309,437 | 5/1994 | Perlman et al. | 370/401 |
| 5,317,568 | 5/1994 | Bixby et al. | 370/401 |
| 5,396,543 | 3/1995 | Beeson, Jr. et al. | 455/560 |
| 5,406,557 | 4/1995 | Baudoin | 370/407 |
| 5,410,590 | 4/1995 | Blood et al. | 379/147 |
| 5,414,754 | 5/1995 | Pugh et al. | 379/88.23 |
| 5,425,026 | 6/1995 | Mori | 370/410 |
| 5,485,455 | 1/1996 | Dobbins et al. | 370/255 |
| 5,502,723 | 3/1996 | Sanders | 370/352 |
| 5,530,703 | 6/1996 | Liu et al. | 370/255 |
| 5,531,634 | 7/1996 | Fischer | 370/405 |
| 5,537,401 | 7/1996 | Tadamura et al. | 370/409 |
| 5,548,589 | 8/1996 | Jeon et al. | 370/399 |
| 5,764,756 | 6/1998 | Onweller | 378/242 |

OTHER PUBLICATIONS

Prentice Hall, X002031754, "Internetworking with TCP/IP," 1991, pp. 270–279.

(List continued on next page.)

*Primary Examiner*—Harry S. Hong
*Attorney, Agent, or Firm*—Holme, Roberts & Owen

[57] ABSTRACT

A communications networking system is disclosed for controlling and monitoring devices within a telephony central office. The networking system includes a high bandwidth local area network (LAN) within the central office for transferring substantially all communications between each central office network element and remote telephony operational support systems (OSSs) that control and monitor network element performance. The LAN simplifies communications within the central office: (a) by substantially eliminating direct connections, between central office network elements and remote OSSs, and (b) by utilizing at least one standardized communication protocol such as TCP/IP, UDP/IP, or OSI when transferring communications over the LAN. The networking system includes a mediation device(s) for translating between network element specific protocols and a standardized protocol used on the LAN. The networking system further includes redundant routers, each acting as an interface between a wide area network (WAN) connecting to the central office and the central office local area network, wherein the WAN provides substantially all of the communications between the central office and the OSSs. One of the routers is used in securing the central office against undesirable access by agents dialing into the central office via the public telephone lines. This router obtains an ID and password from a dial-in agent, and communicates with a remote security center to determine what central office process interfaces the agent may access. The router also prohibits dial-in users from accessing the WAN and thereby accessing other telephony service control sites.

24 Claims, 17 Drawing Sheets

OTHER PUBLICATIONS

IBM Technical Disclosure Bulletin, XP000354726, "Efficient, Real–Time Address Resolution in Backbone Networks of General Topology," Mar. 1, 1993, see whole document.

Francis, P. et al., XP 000477045, "Flexible Routing and Addressing For a Next Generation IP," Oct. 1, 1994, pp. 116–125.

Peterson, L.L., XP000103397, "An Overview of UNP," Apr. 1, 1989, pp. 21–31.

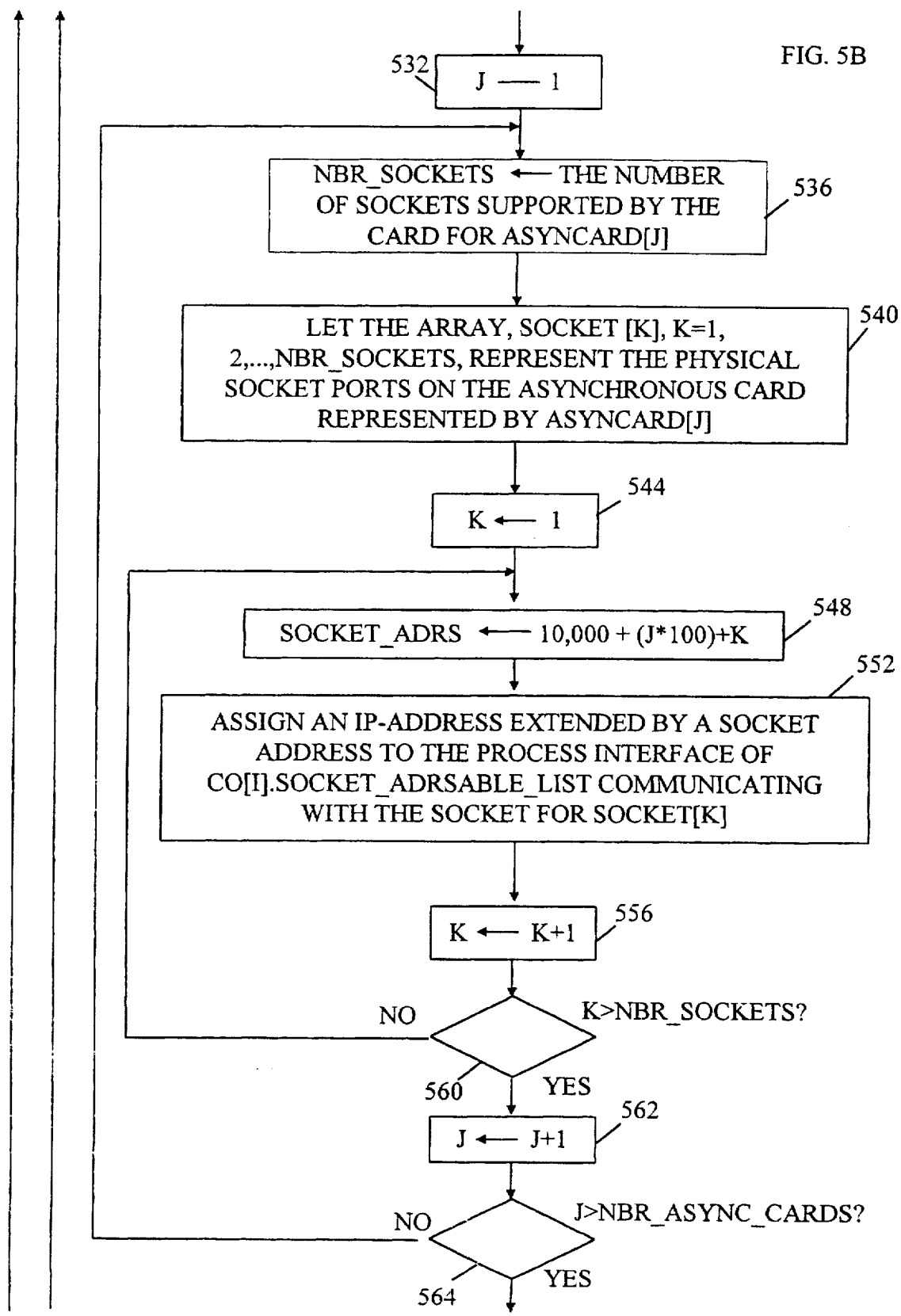

NETWORKED TELEPHONY CENTRAL OFFICES

CROSS-REFERENCE TO RELATED APPLICATION

The present application is a continuation of U.S. patent application Ser. No. 08/585,347 for "NETWORKED TELEPHONY CENTRAL OFFICES" filed Jan. 11, 1996, now U.S. Pat. No. 5,764,756, incorporated herein by this reference in its entirety.

FIELD OF THE INVENTION

The present invention relates to a communications networking system for controlling and monitoring performance of and access to a telephony central office. In particular, the networking system provides enhancements in restricting undesirable access to central office facilities and in simplifying central office communications by providing a local area network in the central office.

BACKGROUND OF THE INVENTION

The incremental deployment of progressively newer technologies by telephony service providers has created, in many cases, a wide range of telecommunications equipment and operations that must be integrated to provide reliable service to subscribers. For example, a telephony provider may have network elements and operational support systems (OSSs) that have been in place for years (known in the art as legacy systems) as well as newer network elements and their associated OSSs that allow more efficient and/or more comprehensive operational support. Thus, there have been, in some cases, substantial duplications of the same functionality using different technologies within service sites for telephony service providers.

The above statements are particularly true for telephony provider central offices and the OSSs to which the central offices connect. In particular, referring to prior art FIG. 1, note that although certain OSSs 10 may be physically coalesced in a single data center 14 as shown, there may be a substantial number of different communication technologies used to monitor and control central offices 20 from such remote locations as data center 14. FIG. 1 illustrates six communication technologies typically used in externally communicating with and controlling devices within central offices 20 from remote locations. They are:

(1.1) A TCP/IP wide area network 24 for high bandwidth communications using the well known standardized TCP/IP protocol. Note that the term wide area network (WAN) is hereinafter intended to refer to any physical network technology that spans larger geographical distances (e.g., from tens to thousands of miles). Further note that TCP/IP is an abbreviation for Transmission Control Protocol/Internet Protocol wherein the Internet Protocol is known as a "network layer" mprotocol and the Transmission Control Protocol is known as a "transport layer" protocol that is constructed on top of the Internet Protocol. Thus, the Internet Protocol (IP) is responsible for establishing, maintaining, and terminating a network connection between two communicating network nodes. The IP is also responsible for transferring information along an established connection. The TCP, on the other hand, is responsible for providing information between communicating network nodes wherein there is an agreed upon level of communication quality. In particular, TCP transmits data as full duplex data streams across a particular network path or "connection" that has been determined between the communicating network nodes. Further TCP/IP is widely used as a foundation upon which higher level or "application layer" protocols depend. More precisely, TCP/IP is a fourth layer protocol, wherein the higher layers are denoted: the session layer ($5^{th}$), presentation layer ($6^{th}$) and the application layer ($7^{th}$)Thus, (as one skilled in the art will understand) the TCP/IP network 24 maybe utilized for communicating in anyone of a number of telephony network management application protocols, for example:

(i) CMIP/CMIS, an application protocol for managing telephony network elements. In particular, CMIP/CMIS is used for communicating with network element communication ports, that utilize OSI networking standards as provided by the International Organization for Standardization (ISO), ISO-8073, or, (ii) SNMP (Simple Network Monitoring Protocol), a standardized internet network management protocol for monitoring network elements having communication ports utilizing the IP.

(1.2) The public telephone network 28 for allowing central office off-site technicians dial access to a central office 20 for monitoring and/or correcting network element 48 malfunctions;

(1.3) An asynchronous proprietary network 52 for establishing communications between network element 48 data ports and "UNIX" based host systems at OSSs 10 of the data center 14, wherein a proprietary network protocol such as "URP" by Datakit is used. Note that a terminal/host computational paradigm may be used between a network element and OSSs when communicating using the network 28. That is, the network element, or more precisely, one of its data ports, behaves like a terminal in that it is controlled by a single host OSS 10 computational device and therefore the data port is dependent on this host for instructing it as to when it should communicate with the host;

(1.4) One or more private point-to-point lines 56 between a central office 20 and a data center 14, wherein transmissions on these dedicated lines may use any number of protocols. However, it may be likely that such transmissions do not use any protocol whatsoever since such point-to-point lines often are viewed as an extension of the network elements 48 so that the operating systems of the network elements are accessible from a remote location such as data center 14;

(1.5) A X.25 network 54 for communicating using the X.25 communication protocol, wherein information is encapsulated in (or converted to) X.25 packets for transmission. Note that a packet assembler/disassembler 56 must be provided at each terminating node of this network to decode and encode X.25 packets from and to the network 54, respectively. Further note that a protocol translator 58 may be connected between packet assembler/disassembler 56 and the network elements 48 for translating the protocol of the disassembled X.25 information into one or more specialized network element 48 protocols such as:

(i) E2A: a telephony protocol developed by AT&T for transmitting state changes and alarm notices between legacy network elements and associated OSSs.

(ii) Synder: a synchronous protocol developed by AT&T for use in controlling digital access to telephony cross connect equipment.

(iii) TBOS: a protocol developed by AT&T for use in providing network element alarms to an OSS. This protocol is based on a structured block of 512 bits.

(iv) BX.25: a protocol defined by AT&T Bell Laboratories for use in providing multiple communication sessions or connections over a single communication channel. This protocol is used only on AT&T manufactured equipment.

(1.6) One or more synchronous networks 60 for supporting primarily IBM host applications of OSSs 10 that require communications with various legacy devices (i.e., technologically outdated devices) such as devices using 3270 terminal emulation software. Note that in some cases communications on these networks use a bisynchronous polled protocol wherein the absence of constant polling by an OSS 10 renders the legacy devices and printers 64 attached to synchronous cluster controller 66 useless.

Given the lack of integration between external communication connections to a central office 20 as FIG. 1 illustrates, it is not surprising that it is very difficult to provide a uniform or consistent management of the external communications on these connections. Moreover, note that although FIG. 1 shows only a single communication line 80 between various communication ports on network elements 48 and other central office devices communicating with the central office external connections, it is important to note that the thick lines within central office 20 represent a plurality of distinct communication lines having, potentially, a distinct communication line per network element 48. Thus, there is potentially a large number of communication lines 80 internal to each central office 20 to be managed. However, since the communication lines 80 have no device in common, it is substantially not possible to uniformly manage the communication in such a center office.

Further note that due substantially to the lack of uniform management of both external and internal communications of a central office 20, there are minimal security features to prohibit unauthorized access to a central office 20 as well as potentially other telephony provider sites via one of the external connections once access to a central office 20 is obtained. In particular, there may be substantial risk that hackers gain access to, for example, network elements 48 in a central office 20 via an off-site processing unit 72 (e.g., a combination of a personal computer and a modem) and the public telephone network 28. Further, there is a risk that if a hacker gains access to a central office 20, then he/she may be able to also gain access to other central offices 20 or a data center 14 by navigating central office external connections.

Thus, it would be advantageous to have a central office architecture that allows better management and increased security for both internal and external communications of a central office. In particular, it would be advantageous to have a central office architecture wherein the internal communications are routed through one or more common devices allowing both better access permissions checking and reducing the number of distinct communication lines between central office devices. Further, it would be advantageous to have a central office architecture wherein communications between telephony provider service sites are provided substantially by a single wide area network wherein security measures may be applied straightforwardly and uniformly.

SUMMARY OF THE INVENTION

The present invention is a system and method for remotely controlling a telephony central office wherein a local area network (LAN) for the central office is used for communication with substantially every network element at the central office. In a preferred embodiment, the system and method of the present invention provides a central office local area network architecture wherein substantially all external communications with the central office are routed through the local area network. Thus, external communications between a telephony centralized control center or operational support system (OSS) and communication ports of network elements at a central office utilizing the present invention must use the local area network.

Additionally, in providing a local area network for a central office utilizing the present invention, it is an aspect of the LAN to be ethernet based as defined in, for instance, IEEE standard 802.3 which may be obtained from the Institute of Electrical and Electronic Engineers and which is hereby incorporated by reference. Thus, such a LAN provides a cost effective, high data rate (e.g., 10 megabytes per second) capability for communicating with substantially all telephony components at the central office. Moreover, it is a further aspect that the LAN include a LAN hub through which all LAN communications are routed. Thus, for example, central office cabling becomes substantially more understandable and less complex.

Note that in finnelling external communications with the central office through such a local area network, an addressing scheme is necessary for uniquely identifying each communication port of each network element at a central office. Further note that since the present invention is contemplated for utilization at a plurality of central offices of a telephony provider, wherein the central offices are connected to the same wide area network (WAN) for allowing a centralized control center to control the network elements at the central offices, it is an aspect of the present invention that such an addressing scheme must uniquely identify each network element communication port across the plurality of such central offices. In particular, it is preferred that the communication port addresses of the addressing scheme be Internet Protocol (IP) addresses of 32 bits that are extended with additional information in a manner wherein various fields within each such extended address provide information regarding both the location and type of the communication port to which the address is assigned. Thus, for example, it is preferred that each such extended IP-address have address fields designating, for the address's communication port: (a) the port's central office identity; (b) the device identity communicating with the port; and (c) an identifier field uniquely identifying the port and its type.

Additionally, it is an aspect of the present invention to provide for at least one common standardized communication protocol to be used in communicating with and through the central office local area network. In particular, it is preferred that the at least one common protocol be an "internet protocol" (hereinafter also denoted IP) wherein the term, internet protocol, is in general meant to be any protocol standard as determined by the Internet Activities Board. In particular, the term, internet protocol includes those protocols having standards in at least one of the following documents, which are incorporated herein by reference: (a) RFC 791 (Internet Protocol); (b) RFC 768 (User Datagram Protocol); (c) RFC 950 (IP Subnet Extension); (d) RFC 793 (Transmission Control Protocol); and (e) RFC 1157 (Simple Network Management Protocol), wherein these references may be obtained from the Internet Assigned Numbers Authority, known as IANA. However, to provide firther clarity here, the term, internet protocol, may be functionally defined as essentially a ISO three layer protocol that contains addressing information and control information for allowing communications to be packetized, routed through a network and subsequently, upon being received at an intended destination, the communication packets are used to reconstruct the communication. Thus, one such standardized protocol will be one of TCP/IP, UDP/IP and OSI. That is, to clarify the meaning of terms here, the following descriptions of the later two protocols are offered (a description TCP/IP having already been given in the background section above).

(2.1) UDP/IP (i.e., User Datagram Protocol/Internet Protocol) is a communications protocol for sending and receiving packetized data wherein UDP/IP uses IP to perform lower level tasks such as addressing and packet communications without substantial error checking for validating substantial error checking for validating an error free communication transmission. Accordingly, the UDP portion of this protocol uses a feature of the IP that does not require a connection determination and setup process prior to sending data packets over a network (e.g., wide area network). Note that typical telephony applications using UDP/UP are applications providing, for example, public telephone switching network monitoring and alarming services to a telephony service provider.

(2.2) OSI (i.e., Open System Interconnection) is a highly structured protocol based upon the seven layer OSI communications model which defines communications interfaces and capabilities from the physical interface of a device to a standardized interface for programmed applications. The OSI protocol uses an E.164 network addressing specification which significantly differs from the TCP/IP "four dot", 32 bit address notation (described in detail herein below).

Note that in providing at least one standardized protocol, a protocol translating device (also known as a mediation device) may be connected to each network element communication port using a protocol not supported by the local area network so that communications using such a non-supported protocol can be converted to one of the local area network supported protocols prior to the communications being transferred over the local area network.

It is a further aspect of the present invention to provide increased bandwidth transmission lines to each central office utilizing the present invention. In particular, the preferred embodiment of the present invention provides each such central office with high bandwidth T-1 lines for external communications for remotely communicating with the central offices. Thus, for the central offices utilizing the present invention, the combination of:

(3.1) each central office's local area network connected to the same wide area network by T-1 communication lines, (3.2) the local area networks and the wide area network using an identical standardized protocol, and (3.3) a uniform addressing scheme for network element communication ports across such central offices as discussed above.

provide a high data rate capacity framework for uniform remote communications with such central offices. Furthermore, this uniformity in communications allows for a reduction in the number of external connections to each such central office from telephony OSSs. That is, in most central office embodiments, there need only be a single T-1 primary external communication line between the central office and the wide area network. However, to increase communication reliability, each such central office preferably also has a backup T-1 auxiliary communication line to the wide area network and a supplemental private (or non-wide area network) line for further central office communications backup (e.g., in case the WAN becomes incapable of robustly providing communications). Additionally, with the reduction in the number of external OSS connections to each central office utilizing the present invention, there is a concomitant reduction in the equipment provisioning for such central offices since there is no longer a need for distinct pieces of equipment and/or systems to redundantly support the relatively large number of external connections to central offices having prior art configurations.

It is a further aspect of the present invention that there be enhanced security features regarding unauthorized access to central offices utilizing the present invention. In particular, a user or agent dialing into a central office via a dial access public telephone line is required to provide a periodically changing password obtained from a transportable security device to which the agent must have access. Further, prior to being connected to any network element communication port at a central office, a routing device at the central office sends a request to a remote centralized access authorization center, via the above-mentioned wide area network connected to the central office, to retrieve access permissions regarding the agent. Thus, the agent may be allowed access only to the network element communication ports granted by the permissions retrieved. Furthermore, note that the agent is inhibited from gaining access to the wide area network. Thus, an additional measure of security is provided in that the agent is restricted from accessing other telephony provider sites connected to the WAN.

The present invention therefore provides the following additional advantages. A uniform central office architecture is provided that may be used substantially throughout all central offices of a telephony provider. Moreover, the central office architecture of the present invention is both easier to understand and reduces undesirable provisioning redundancies. The present invention also has the advantage that it allows better utilization of central office telephony equipment. In particular, there is a better utilization of state-of-the-art telephony systems in that central offices utilizing the present invention have the increased bandwidth for external communications typically needed to effectively utilize such state-of-the-art systems. Furthermore, since the present invention incorporates protocol translating or mediation devices between the local network and the older or less advanced network elements whose communication ports utilize LAN non-supported protocols, such central offices may also continue to utilize these network elements until they can be cost effectively retired.

Other features and benefits of the present invention will become apparent from the detailed description with the accompanying figures contained hereinafter.

BRIEF DESCRIPTION OF THE DRAWINGS

FIGS. 5A, 5B and 5C present a flowchart for assigning network addresses to asynchronous process interfaces at central offices;

DETAILED DESCRIPTION

Figure 2A:
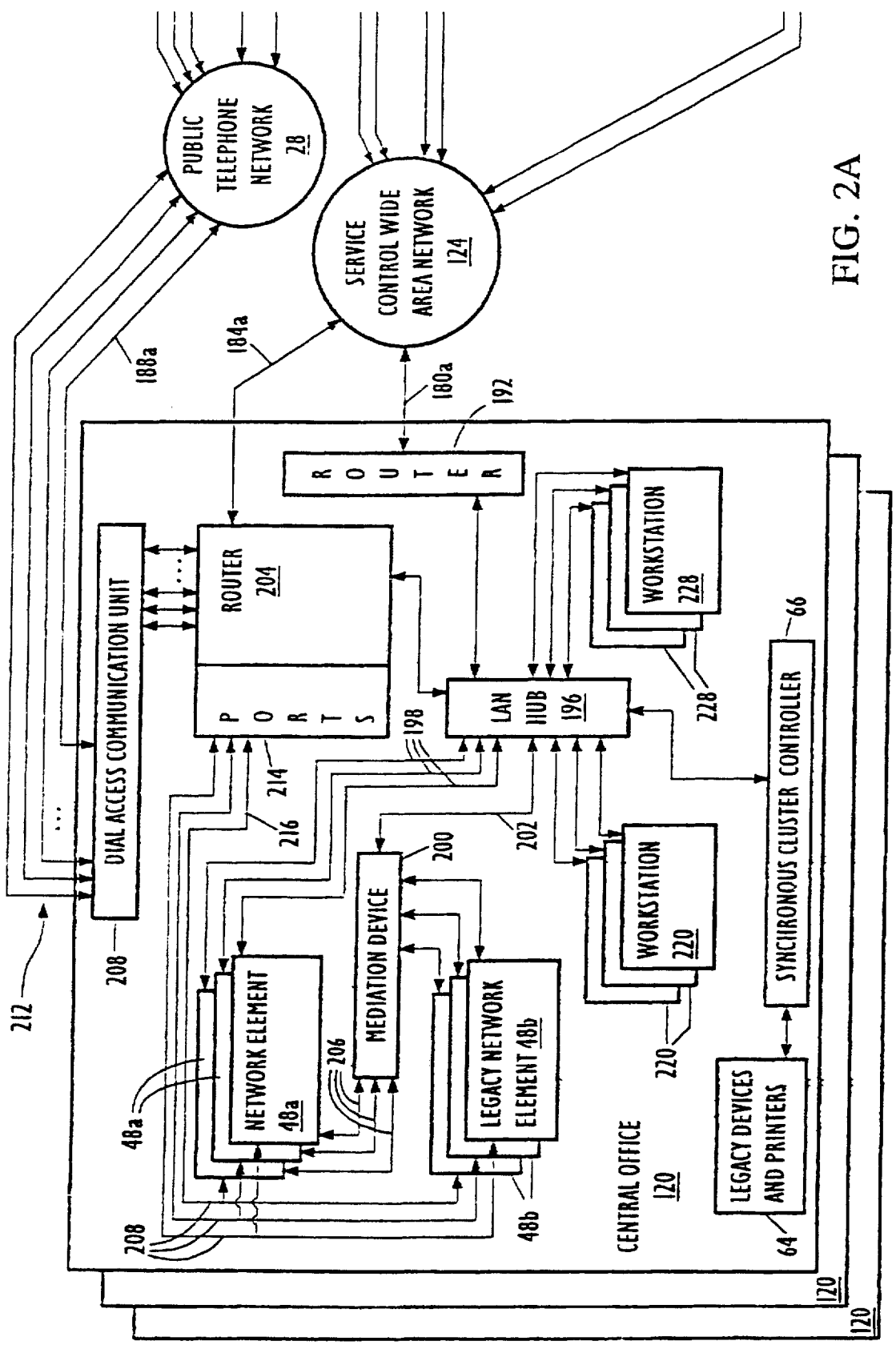
FIGS. 2A and 2B illustrate a communications architecture for a telephony central office utilizing the present invention together with the central offices communications connections with external sites that may be used in controlling and monitoring the performance of, for example, network elements at the central office.
Figure 2B:
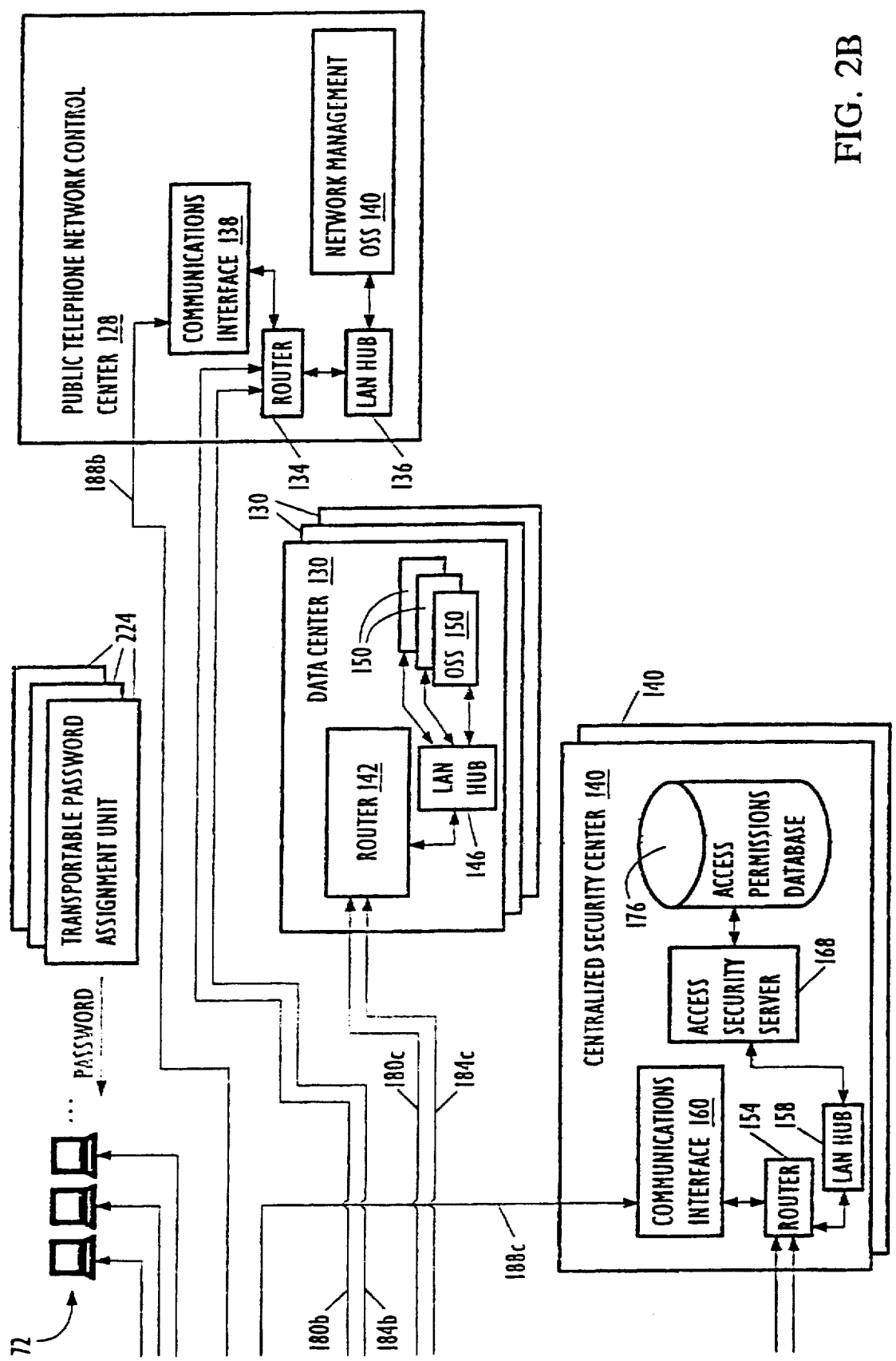

FIGS. 2A and 2B presents a block diagram of a central office 120 having the architecture of the present invention. Accordingly, each central office 120 has a novel control and communication architecture for communicating with both a service control wide area network 124 and a public telephone network 28, wherein each of these networks provides the capability to control and/or monitor various portions of the central offices 120. In particular, the service control wide area network 124 provides the communication channels between the central offices 120 and each of: (a) the public telephone network control center 128, (b) one or more data centers 130, and (c) one or more centralized security centers 132. Briefly describing each one of these centers 128–132 in turn, note that the public telephone network control center 128 is used for monitoring and controlling network traffic on the public telephone network 28. In providing this capability as it relates to the present invention, the public telephone network control center 128 includes a router 134 and a local area network hub 136 for receiving and forwarding most of the communications between the network management OSS 140 and the central offices 120 via service control wide area network 124. Thus, the network management OSS 140 is responsible for controlling the traffic on public telephone network 28 by typically modifying control data used by the network elements 48A and 48B (hereinafter also denoted network elements 48) at the central offices 120. That is, network element control information flows between network management OSS 140 and substantially every one of the network elements 48 in each central office 120 via preferably the service control wide area network 124. Additionally, the control center 128 also includes a communications interface 138 allowing the center 128 to communicate with central offices 120 via the public telephone network 28, preferably to diagnose malfunctions in communications using the wide area network 124 with the central offices 120.

Regarding the data centers 130, each includes a router 142 that is substantially similar to router 134 in that (as with all routers described herein) each router provides (as needed): (i) protocol conversion, (ii) data rate conversion and (iii) communications routing. Thus, router 142 provides these capabilities between local area network hub 146 and communication lines 180c and 184c described further below. Moreover, each data center 130 also includes one or more telephony operational support systems (OSS) 150, connected to the local area network hub 146, wherein each such OSS provides a telephony support service such as billing, provisioning or network surveillance.

In each centralized security center 132, there is a router 154, a local area network 158 and a communications interface 160 for communicating with the central offices 120 in substantially identical fashion to their counterparts 134, 136 and 138 of control center 128. Thus, the components 154, 158 and 160 provide communication between a security access server 168 and the central offices 120 so that agents (e.g., telephony technicians) seeking access to network elements 48 and/or the service control wide area network 124 via, for example, off-site processing units (e.g., personal computers) 72 may be identified and their access or authorization permissions determined. In particular, as will be described further below, the access security server 168 is queried by each central office 120 whenever there is an attempted access by an agent via an off-site processing unit 72 so that the access security server 168 may retrieve from the access permissions database 176 information that can be used in authenticating the agent's identity and determining the access permissions the agent has regarding various network elements 48 and the service control wide area network 124.

Figure 1:
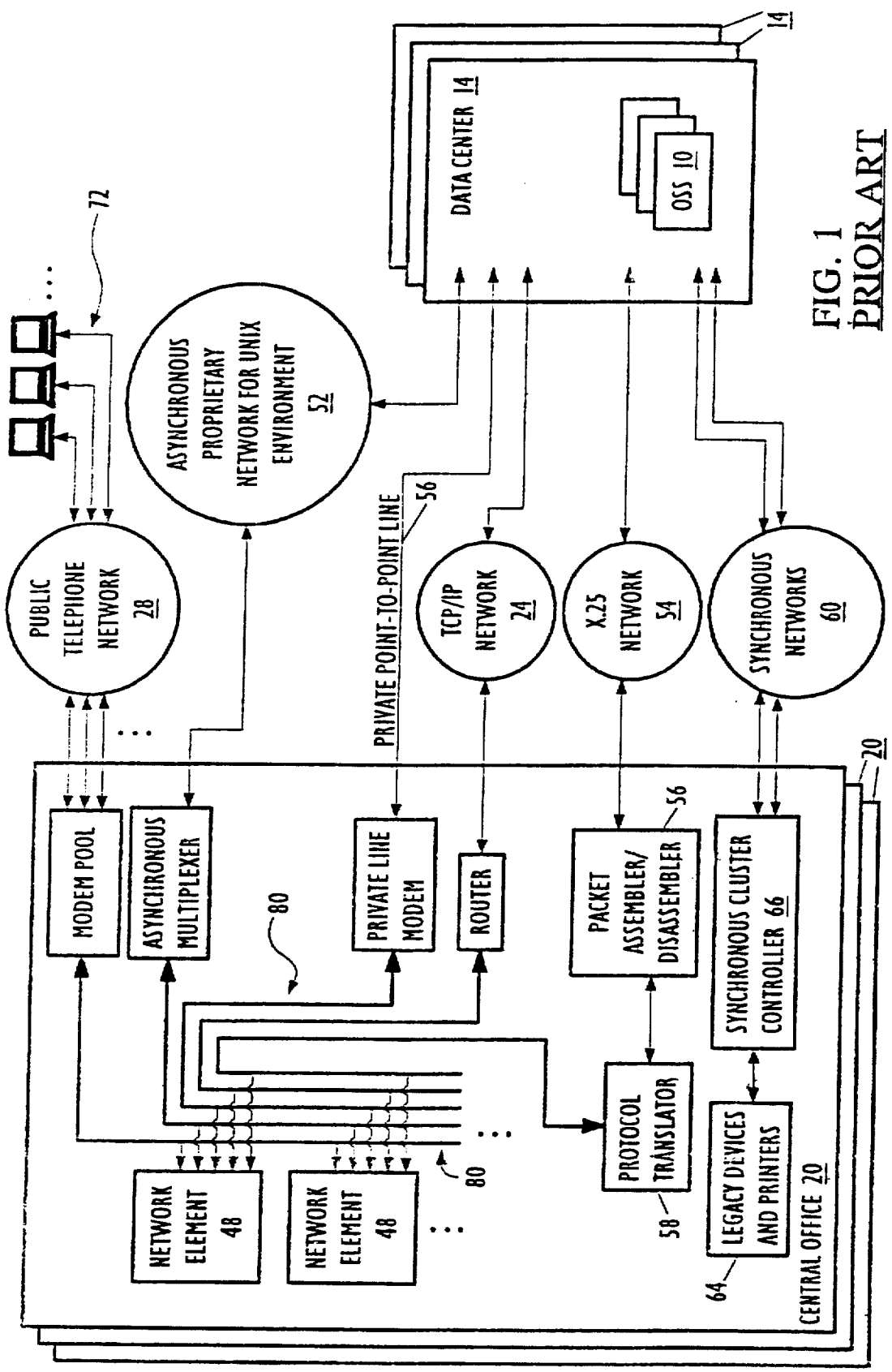
FIG. 1 illustrates a typical prior art telephony central office communications architecture for controlling the central office one or more remote sites.

Note that it is an important aspect of the present invention that for each of the central offices 120, there are redundant communication lines with each of the centers 128–132. The communication lines 180a–d represent the primary communication path for communications between the central offices 120 and the centers 128–132. These communication lines provide high data transmission rates that, in conjunction with the high data transmission rate of wide area network 24, allows data to be transferred much faster than many of the networks shown in FIG. 1. In particular, since it is preferred that:

(4.1) communication lines 180 be T-1 lines, (4.2) the service control wide area network 124 be capable of transmitting substantially all transmissions at least T-1 rates, and (4.3) the preferred transmission protocol be TCP/IP, the present configuration has a substantially higher rate than networks 52, 54 and 60 of FIG. 1. For example, networks 52, 54 and 60 have a reliable data rate of 1,200 bits per second, whereas in the configuration of FIG. 2, the data paths between a network element 48 and OSS 150 have reliable data rates of: (a) 10 megabits per second on the local area networks corresponding to LAN hubs 196 and 146; (b) 1.5 megabits per second on the service control wide are network 124; and (c) 4,800 bits per second between network elements 48 and the multiplexing mediation device 200 (discussed below). Thus, one skilled in the art will appreciate the data rate increase provided by the present invention.

Further note that since (3.1)–(3.3) provide such a substantially higher bandwidth than the requirements for most central offices 120, additional and/or more sophisticated network elements 48 requiring additional bandwidth with one or more of the centers 128–132 may be easily accommodated without connecting additional lines to the central offices 120.

For each central office 120, there is also a second set of communication lines 184a–d for transferring data between the central office and the centers 128–132 in conjunction with wide area network 124. These lines are intended to be backup or supplemental data lines in the event, for instance, that some portion of the lines 180 become inoperative or faulty. Thus, if for example communication line 180b becomes faulty, then line 184b may be used in conjunction with either 180a or 184a for maintaining communications between a central office 120 and the public telephone network control center 128. Accordingly, note that it is preferred that communication lines 184 also be T-1 lines.

For each central office 120, there is also a third set of communication lines 188a–c. These communication lines provide a further backup communication capability between the centers 128–132 and the central offices 120. In particular, the communication lines 188 are connected via the public telephone network 28 rather than the service control wide area network 124. Thus, in the event that the wide area network 124 malfunctions, at least some communication between the centers 128–132 and the central offices 120 may be provided without substantial delay. Note, however, instead of being private access lines as is the case with communication lines 180 and 184, the communication lines 188 are asynchronous dial access lines substantially identical to telephone lines provided to subscribers of the public telephone network 28. Further note that the quantity and type of information transferred over communication lines 188 may be different from those transferred via 180 and 184 in that, in the event where there is no reliable communication from either lines 180 or 184, the communication on lines 188 preferably include diagnostic data communications for determining the degree or extent of the communication malfunction. For example, communication lines 188 may be utilized in determining whether one or more components of a central office 120 are causing communication malfunctions or whether the malfunction is likely to be related to the wide area network 124. Accordingly, to provide the configuration of the present invention cost effectively, communication lines 188 may have a substantially lower bandwidth than the T-1 lines 180 and 184.

Referring now to the internal components of each central office 120 configured according to the present invention, there is at least one router 192 for providing the primary wide area network 124 interface to the router's central office 120. Accordingly, as mentioned regarding routers hereinabove, in performing as an interface to the wide area network 124, a primary function of each router 192 is to perform data rate conversions for communications between a local area network (i.e., LAN) hub 196 and the wide area network 124. In particular, assuming for simplicity only that there is a single router 192 and a single LAN hub 196 hereinafter, note that the LAN hub 196 communicates with the router 192 at a data rate of about 10 mbps (megabits per second), whereas the data rate of communications between the router 192 and the wide area network 124 is about 1.544 mbps. Further, as also mentioned hereinabove, routers typically also have a capability for providing protocol conversion or translation between at least some of the standard communication protocols. Thus, since one important aspect of the present invention is that the protocol used for communications on at least the communication lines 180 and 184 is TCP/IP, and since the protocol used by the LAN hub 196 for communicating with central office components is either TCP/IP or OSI, UDP/IP, the router 192 needs only to perform protocol conversions between TCP/IP and these other protocols as appropriate.

The LAN hub 196 provides an important aspect of the present invention in that it is the primary communication distributor within the central office 120. For example, the LAN hub 196 communicates with network elements 48a via communication lines 198. Further, the LAN hub 196 facilitates the reduction of both the plurality of internal data communication lines 80 (FIG. 1) and the plurality of external data communication lines (connected to the prior art central offices 20 via networks and lines 24, 52, 54 and 60). To provide this aspect of the invention, the LAN hub 196 must be capable of, in particular, transferring data between network elements 48 and router 192 without degrading the performance of network elements 48. To accomplish this, it is preferred that the LAN hub 196 has a data transfer rate between the devices it services of 10 mbps to 16 mbps. In order to fulfill this requirement, it is preferred that the LAN hub 196 be ethernet based and use an ethernet based protocols such as TCP/IP, UDP/IP and OSI as discussed hereinabove.

Also, it is important to note that the local area network architecture of the central office 120 is able to support communications with both the more state-of-the-art network elements 48a providing advanced features and adhering to telephony developed standards as well as older legacy network elements 48b that are less technologically advanced and may not support telephony standards. In order to provide this capability, the present invention also includes a mediation device or protocol translator 200 that is capable of translating between the TCP/IP, UDP/IP and/or OSI protocol by which the translator communicates with the LAN hub 196 via, for example, communication line 202 and the specialized protocols (in some cases, vendor specific) that are utilized by many network elements 48 in communicating via communication lines 206 and 208. Thus, since the legacy network elements 48b are unlikely to have any data communication ports supporting TCP/IP, UDP/IP or OSI, substantially all data transfers between the LAN hub 196 and the legacy network elements 48b are through the mediation device 200. Alternatively, many of the newer network elements 48a have at least some of their data ports designed to accept at least one of the protocols UDP/IP, TCP/IP and OSI. Thus, such network element ports may be connected directly to the LAN hub 196.

Additionally, note that the LAN hub 196 also supports communications for legacy devices and printers 64 via synchronous cluster controller 66 as in the prior art central office architecture of FIG. 1. In particular, this is accomplished by upgrading each cluster controller 66 so that the polling of the legacy devices and printers 64 is provided by the cluster controller (instead of from a remote data center), and further so that the cluster controller communicates with the LAN hub 196 using TCP/IP.

A second router 204 is also connected to the LAN hub 196. When faults are detected regarding router 192 and/or communication lines 180, router 204 is used in an alternate data communication path (including communication lines 184) to the LAN hub 196. In providing this capability, router 204 functions substantially as router 192. Thus, router 204 provides any data rate conversions between communication line 184a and the LAN hub 196 as well as any necessary protocol conversions. Additionally, router 204 has a plurality of asynchronous connections with dial access communication unit 208 that is used for communicating with agents using off-site processing units 72 via asynchronous dial access lines 212 for entering the central office 120 from the public telephone network 28. Note that the dial access communication unit 208 preferably includes a modem chassis with a plurality of V.42BIS or V.34 modems. Further note that communication line 188a also connects to dial access communication unit 208 for at least interrogating and monitoring components of the central office 120 whenever, for example, wide area network 124 malfunctions.

Returning now to router 204, note that it includes a plurality of asynchronous router ports 214. Each such router port is directly connected to a different communication port on one of the network elements 48 via one of the asynchronous access lines 216. Each connection of one of these lines to a network element 48 is substantially to a network element console port for, for example, initiating and terminating various processes performed on the network element. Accordingly, these console ports communicate with various computational devices that allow users or agents to monitor network element performance and diagnose network element malfunctions. More precisely, communication with the network element 48 console ports is provided in at least two ways. In a first way, technicians or operators at the central office 120 may use one or more workstations 220 to access the console ports of various network elements 48 via the LAN hub 196 and the router ports 214. Alternatively, since it is important that network elements 48 are reliably functioning as much as possible, central office technicians and certain network element vendor support personnel are provided with dial-in access via, for example, one of the off-site processing units 72 so that off-site monitoring and diagnosis of network element malfunctions can be performed. Thus, such off-site communications with the network element console ports is provided via asynchronous dial access lines 212, dial access communication unit 208, router 204 (including router ports 214) and asynchronous communication lines 216.

It is also worthwhile to note here that there are a number of additional security related features provided by the present invention. For example, referring again to the off-site dial-in access to a central office 120, agents desiring such access must provide both a log-in identification and a password or pass-code obtained from a personal transportable password assignment unit 224 that is substantially synchronized with the access security server 168 for automatically and periodically changing the password of the agent whose log-in identification is associated with a particular one of the transportable password assignment units 224. Thus, as will be described in further detail below, when an agent attempts to access a central office 120 via an off-site processing unit 72, the agent's identification and current password are encapsulated in, for example, a TCP/IP packet by the router 204 and transferred to the centralized security center 140 for verification via communication line 184a, wide area network 124 and communication line 184d. As an aside, note that by using communication lines 184 instead of lines 180 a very low volume of traffic is at least periodically maintained on lines 184 as a validation that lines 184 are functioning properly.

Additionally, it is commonplace to have business applications performed at central office 120 sites and/or remotely activated at, for example, a data center 130 by personnel at a central office 120 via service control wide area network 124. For example, it is desirable that a centralized business application for tracking inventory and parts in all central offices 120 be accessible by telephony provider personnel at the central office. Further note that this is particularly important for central offices 20 that are located in remote locations and/or are infrequently visited by telephony personnel since in both cases, the time to repair a particular central office 120 malfunctioning component may require substantial lead time if parts are not inventoried properly due to a lack of adequate inventory management. Accordingly, workstations 228 are connected to LAN hub 196 so that telephony provider personnel may activate such business applications. However, since such business applications typically do not need access to the network elements 48, it is a further aspect of the security features of the present invention that workstations 228 are connected to a partition of the LAN hub 196 whereby they have access to the service control wide area network 124 but do not have access to the network elements 48. As an aside, note that alternative embodiments of the present invention may also be used to implement this partitioning. In particular, a separate LAN hub may be used to connect the workstations 228 to the router 192. That is, separate LAN hubs 196 can be attached in a tree-type architecture or in a daisy chain configuration.

To further describe the various components of a central office 120, the following is a list of example commercially available components that maybe used in the central office:

(5.1) Router 192: Cisco router model 2514;

(5.2) LAN hub 196: model AISwitch 180 by Applied Innovation; note the LAN hub is equipped with multiple AI 194 cards and associated display panels;

(5.3) Mediation Device 200: Model AISwitch 180 also by Applied Innovation; note the mediation device is equipped with multiple AI185 asynchronous cards and associated panels, multiple AI192-XR4 X.25 cards and associated panels, and one AI193-TX card for TC P/IP interface connection to an AISwitch 180 chassis;

(5.4) Router 204: Cisco router model 2511;

(5.5) Dial access communication unit 208: a General Datacom SPECTRACOMM shelf model 11 equipped with multiple V.34 modems by Memorex, Apertus and IBM;

(5.6) Synchronous cluster controller 66: Memorex model 6544.

In order to provide both local area networking as well as wide area networking, communication ports supplying and/or receiving network information must be uniquely identified. In particular, each such communication port must be uniquely addressable from all other such communication ports in all central offices 120. Additionally, it is preferred that an addressing scheme be provided that not only assigns a unique address to each such communication port across all central offices 120, but also provides a methodology for creating such addresses wherein each address has a uniform format that includes descriptive fields for the communication port to which the address is assigned. For example, it is preferred that the address of a communication port include identification of the central office having the port as well as identification of the device upon which the port resides.

Figure 3A:
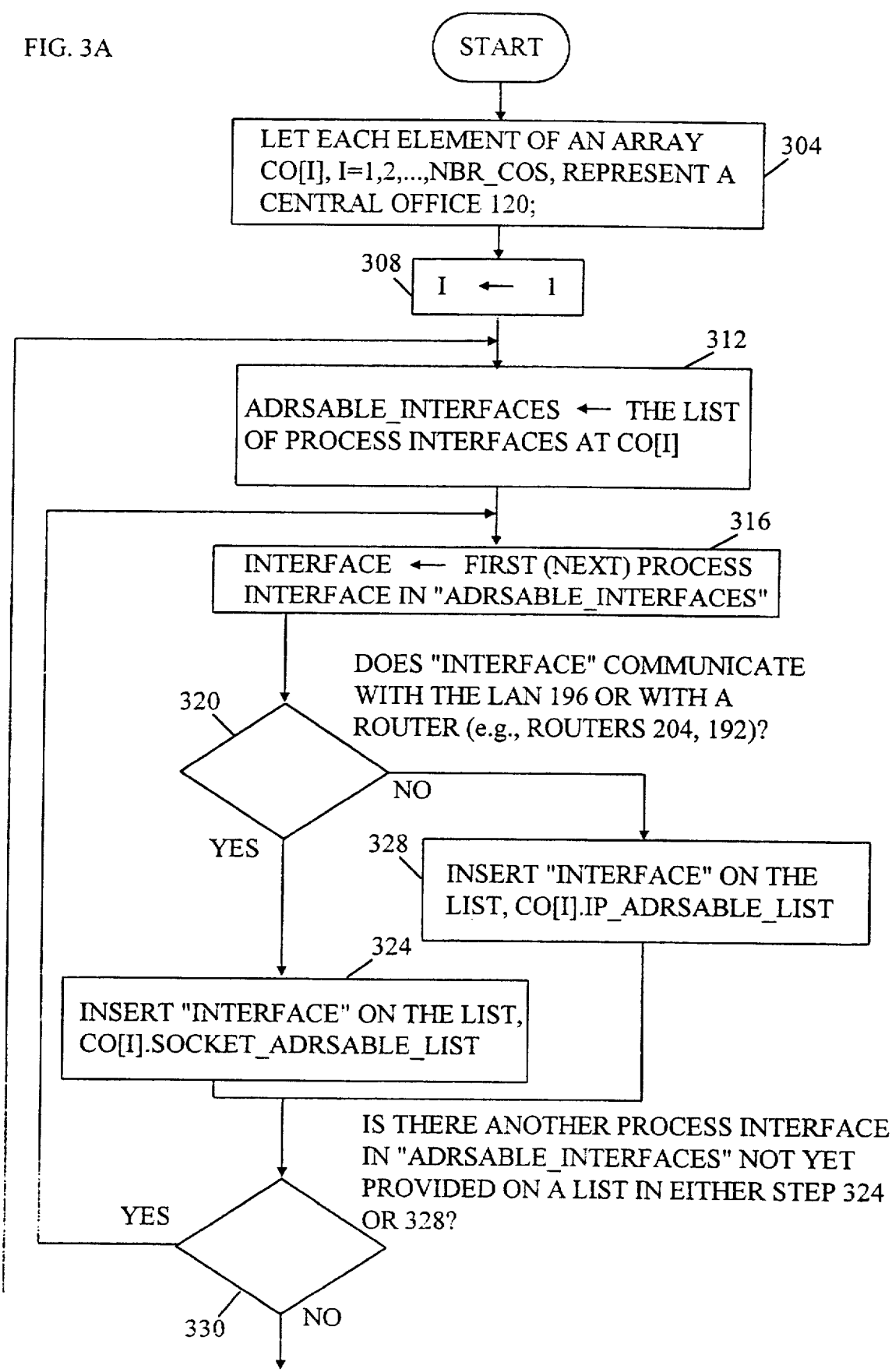
FIGS. 3A and 3B present a flowchart for determining the IP-addressing scheme of the present invention.
Figure 3B:
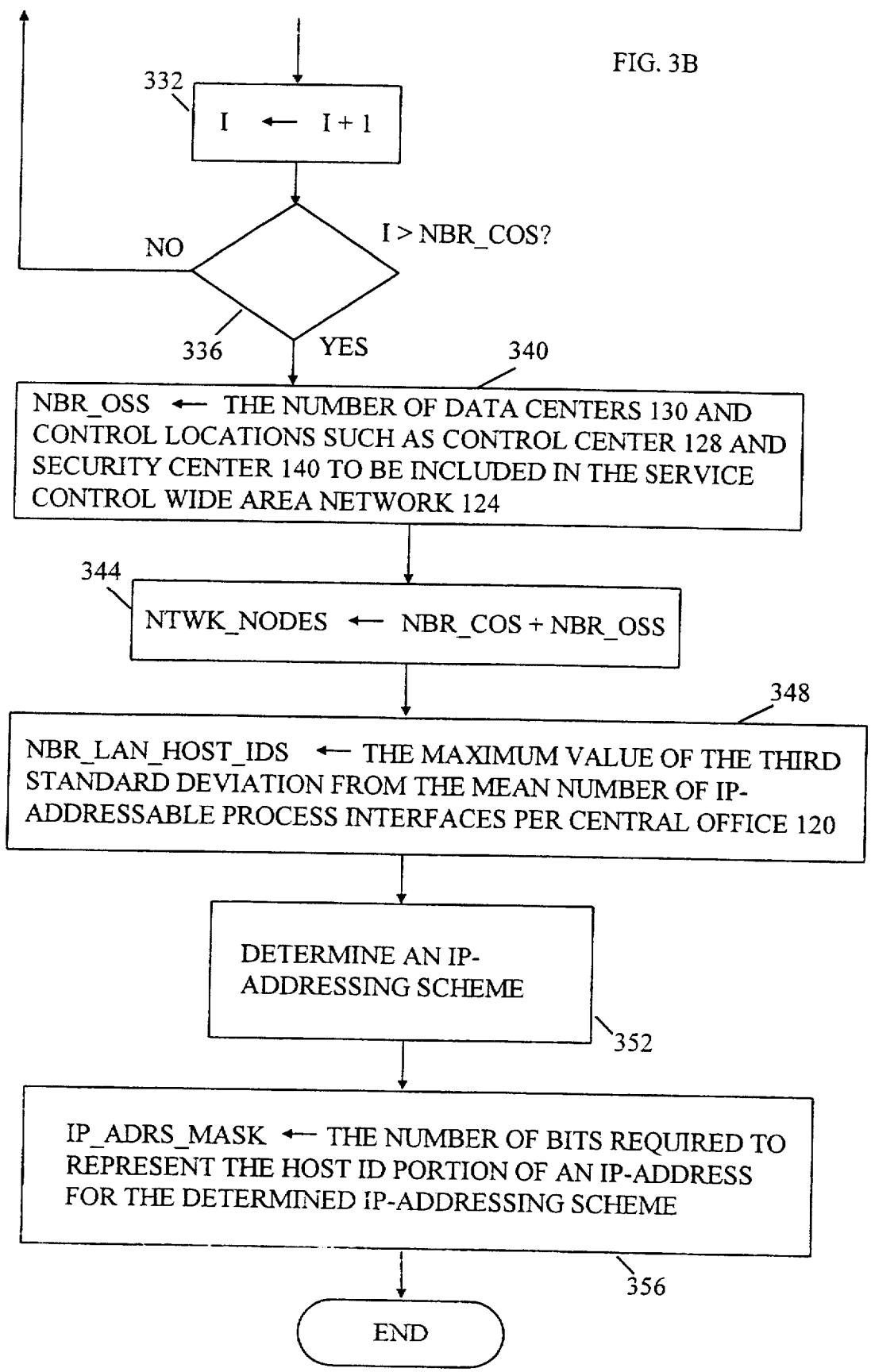

Referring now to FIGS. 3A and 3B, a flowchart is presented for determining the IP-addressing scheme of the present invention. That is, the flowchart of these figures provides a procedure for determining an IP-addressing scheme for those process interfaces in central offices 120 that are to be uniquely identifiable by an IP-address. Further, the flowchart also determines, for each central office 120, a list of other process interfaces that cannot be addressed solely by an IP-address. Instead, these process interfaces require an "extended" address wherein further addressing information must be utilized in conjunction with an associated IP-address.

Commencing now with a description of the steps for the flowchart of FIGS. 3A and 3B, in step 304 an array, CO, is defined having elements CO[I], I=1,2, . . . ,NBR_COS is such that each element of this array represents a record corresponding to a central office 120. Since the identifier, I, is an index for accessing the records for this array and since the process interfaces to be addressable solely by IP-addresses are iteratively determined for each central office 120, the identifier, I, is initialized to 1 in step 308. Subsequently, in steps 312 through 336, a loop is provided wherein for the central office 120 of CO[I], two lists are created: (a) a list of process interfaces that are to be addressable solely by an IP-address (i.e., the list, CO[I].IP_ADRSABLE_LIST), and (b) a list of process interfaces wherein each process interface on the list is identified by an extended IP-address having additional addressing information such as, for example, a socket address or a logical channel number.

Describing the loop of steps 312 through 336 in detail, in step 312 the identifier, ADRSABLE_INTERFACES, is assigned the list of process interfaces for the central office 120 represented by CO[I] wherein for each such process interface: (a) the process interface is able to recognize an address assigned to it when address configuration is completed and the process interface is enabled, and (b) it is deemed desirable to send or receive communications using an address assigned to the process interface. Subsequently, in step 316 the identifier, INTERFACE, is assigned the first process interface from the list, ADRSABLE_INTERFACES. Following this, in step 320 a determination is made as to whether the process interface, INTERFACE, is to be addressable solely by an IP-address or instead by an IP-address plus extended addressing information. In particular, a determination is made as to whether the process interface of INTERFACE communicates with one of the LAN hub(s) 196 or router(s) 204, and further whether: (a) the communication is through a second process interface in ADRSABLE_INTERFACES, (b) the second process interface provides a socket through which the communications traverse, and (c) the socket is a gateway between "INTERFACE" and the LAN 196 or router 204. If all of these conditions are met, then INTERFACE represents a process interface that will be addressed using extended addressing information. Therefore, in step 324 INTERFACE is inserted into a list associated with the present central office 120 (i.e., the list CO[I].SOCKET_ADRSABLE_LIST) for process interfaces to be assigned extended IP-addresses. Alternatively, if the condition of step 320 is not satisfied, then the process interface is to be identified solely by an IP-address. Therefore, in step 328 the process interface identified by the variable "INTERFACE" is inserted onto an IP-addressable list for the present central office 120 (i.e., CO[I].IP_ADRSABLE_LIST). Subsequently, in step 330 a determination is made as to whether there is another process interface in the list, ADRSABLE_INTERFACES, that has not yet been provided on one of the lists of either step 324 or 328. If such a process interface exists, then step 316 and step 320 are once again executed with the next process interface and, subsequently, this next process interface is inserted into one of the lists in either step 324 or step 328. Alternatively, if in step 330 it is determined that all process interfaces have been examined, then step 332 is encountered wherein the index, I, indicating the central office 120 currently being examined is incremented. Subsequently, in step 336 a determination is made as to whether there are further central offices 120 to have their process interfaces examined. That is, if the index, I, is greater than NBR_COS, then all central offices 120 have been processed. Alternatively, if this condition is false, then processing resumes at step 312 for the examination of the process interfaces at the next central office 120.

Assuming that all central offices 120 have been examined in the loop of steps 312 through 336, then in step 340 the identifier, NBR_OSS, is assigned the number of data centers and control locations for including in the service control wide area network 124. Subsequently, in step 344 the number of wide area network 124 nodes (i.e., NBR_COS+NBR_OSS) is assigned to the identifier, NTWK_NODES.

In step 348 the identifier, NBR_LAN_HOST_IDS, is assigned a value larger than the number of IP-addressable process interfaces in each central office 120 for substantially all central offices 120. That is, this identifier is assigned the maximum value of the third standard deviation from the mean number of IP-addressable process interfaces per central office 120.

Note that for large telephony providers, it is believed that without conserving IP-addresses, there may not be enough IP-addresses for addressing all desired process interfaces throughout all central offices 120 of the telephony provider wherein each process interface IP-address also provides information related to the communication path with the process interface; e.g. the location or position of hardware components along the path. As one skilled in the art will appreciate, IP-addresses are provided by a "dot notation" wherein each IP-address can be represented as a sequence of four decimal numbers separated by three dots such that, from left to right, a "network ID" portion is provided by one, two or three of the dotted decimal numbers depending on the IP-addressing scheme utilized while the remaining one or more numbers in the dotted notation provide what will be referred to here as the "local ID" portion of the IP-address. Accordingly, one interpretation of the network ID portion of an IP-address is that it is used to uniquely address a local area network (or equivalently all the nodes on the local area network) that are in communication with an IP-addressable wide area network. Additionally, the local ID portion of an IP-address may be interpreted as an address for a particular process interface on such a local area network. However, alternative interpretations can be specified. In particular, to supply an IP-addressing scheme for all process interfaces in all central offices 120, the following semantics are used for the IP-addresses:

(6.1) the network ID portion of an IP-address will denote a physical location on the wide area network 124 such as a central office 120, a data center 130, or control locations such as control center 128 and security center 140;

(6.2) the local ID portion of an IP-address will be an encoding having two subportions: a LAN/router ID portion and a host ID portion. The LAN/router ID uniquely identifies a LAN hub 196 or a router 204 through which the process interface having the IP-address communicates. The host ID portion supplies the remainder of the IP-address that uniquely identifies the process interface.

Note that the LAN/router ID uses as few bits of the local ID portion as is necessary so that, for each central office 120, each of the one or more LAN hubs 196 and each of the one or more routers 204 in the central office have unique binary values in the LAN/router ID. Additionally, the LAN/router ID is provided by the leftmost bits of the local ID portion. Further, since it is customary for the values "00" and "11" in the leftmost two bits of the local ID to be reserved, the number x of bits in the LAN/router ID must be such that $2^x-2 \geq$ (the number of LAN hubs 196)+(the number of routers 204) for each central office 120.

Thus, since (as will described below) the identifier, NBR_LAN_HOST_IDS, determines the amount of the IP-address space allocated per LAN hub 196 (or router 204), assigning a value for this identifier that allows most (but not necessarily all) central offices 120 to accommodate their IP-addressing requirements with a small number (likely one) of LAN hubs 196, the number of unassigned IP-addresses is reduced in comparison to, for example, if NBR_LAN_HOST_IDS were assigned the maximum number of process interfaces in any central office 120. Thus, it is believed that in determining NBR_LAN_HOST_IDS as in step 348, the number of IP-address bits required for the local ID portion is sufficiently close to a minimum number of bits so that a larger number of IP-address bits can have their bit values used for other purposes than allocated for process interfaces within central offices 120. Furthermore, note that other computations for determining the value of NBR_LAN_HOST_IDS is also contemplated in order to compact the IP-addresses allocated for central offices 120 to a numeric range wherein the number of IP-addresses actually assigned of those allocated is relatively high. In particular, any computation that ignores or discounts the number of IP-addressable process interfaces in inordinately large central offices 120 may be a candidate for computing NBR__LAN_HOST_IDS. Thus, for example, assigning to NBR__LAN_HOST_IDS the maximum number of IP-addressable process interfaces of a central office 120 that is not in the 5% of the largest central offices is a candidate.

As an example of one decomposition of IP-addresses, of the 32 bits for each IP-address, if the leftmost 16 bits (corresponding to the left two decimal numbers) of the IP-address represent the network ID portion such as mentioned above, then the remaining 16 bits (i.e., the remaining two decimal numbers) of the IP-address designate the local ID portion. Further, as can be seen in Table A, if there is at most six LAN hubs 196 and routers 204 per central office 120, then the first three leftmost bits of the local ID portion are sufficient to uniquely identify each LAN hub 196 and router 204 of each central office. Therefore, since there are 13 bits remaining in the host ID, there are $2^{13}$ (equaling 8,190) IP-addresses for process interfaces that may communicate via each LAN hub 196 or router 204.

Thus, in step 352, the IP-addressing scheme is determined wherein:

(a) each process interface put on a list CO[I].IP__ADRSABLE_LIST, I=1,2, . . . ,NBR_COS has a different IP-address;

(b) the identifier, NTWK_NODES, is less than the number of binary values that can be allocated in the network ID portion of the IP-addresses for the IP-addressing scheme (note of the certain binary values here are typically reserved);

(c) for each central office 120 represented by CO[I], I=1,2, . . . ,NBR_COS, the process interfaces on CO[I].IP__ADRSABLE_LIST have identical network ID portions for their IP-addresses;

(d) the IP-addressing scheme allocates two or more bits for the LAN/router ID of the local ID portion of each IP-address so that at least two LAN hubs 196 in a central office 120 can be distinguished by the IP-addresses; and (e) the number of distinct binary values obtainable in the host ID portion of the local ID of the IP-addresses is greater than or equal to NBR_LAN_HOST_IDS. Note that it is believed that for substantially all known or proposed telephony provider configurations of central offices 120 on a wide area network 124, there is an IP-addressing scheme which satisfies the criteria of step 352. In particular, as one skilled in the art will appreciate, Class B IP-addressing schemes are most suitable for the present invention. Thus, referring to Table A, the rows in the center of the table corresponding to Class B are the mostly likely candidate IP-addressing schemes.

Lastly, in step 356 the size or number of bits required to represent the host ID portion of the selected IP-addressing scheme is assigned to the identifier IP_ADRS_MASK. Note that, as one skilled in the art will appreciate, IP_ADRS_MASK represents the number of bits on the right of each IP-address that is masked off (i.e., ignored) during transmission of an IP-addressed packet through the wide area network 124. Such masking allows greater flexibility in modifying network addressing schemes at low levels such as in central offices 120. However, certain network components use the masked bits in order to properly route information to specific IP-addressable process interfaces. In particular, routers such as 192 and 204 may use substantially only the masked bits of an IP-address to route communications to a process interface in the same central office 120 as the routers. Accordingly, the mask size corresponding to the identifier, IP_ADRS_MASK, must be specified uniformly throughout the wide area network 124 as well as in routers such as router 192 and 204 within each central office 120.

TABLE A

| Address Class | Local ID Field | LAN/Router ID bits | Host ID bits | Numb. of LANs | Numb. of Hosts per LAN |
|---|---|---|---|---|---|
| 8 | 16 | 2 | 14 | 2 | 16382 |
|  |  | 3 | 13 | 6 | 8190 |
|  |  | 4 | 12 | 14 | 4094 |
|  |  | 5 | 11 | 30 | 2046 |
|  |  | 6 | 10 | 62 | 1022 |
|  |  | 7 | 9 | 126 | 510 |
|  |  | 8 | 8 | 254 | 254 |
|  |  | 9 | 7 | 510 | 126 |
|  |  | 10 | 6 | 1022 | 62 |
|  |  | 11 | 5 | 2046 | 30 |
|  |  | 12 | 4 | 4094 | 14 |
|  |  | 13 | 3 | 8190 | 6 |
|  |  | 14 | 2 | 16382 | 2 |
|  |  | 15 | 1 | 32766 | 1 |

Figure 4A:
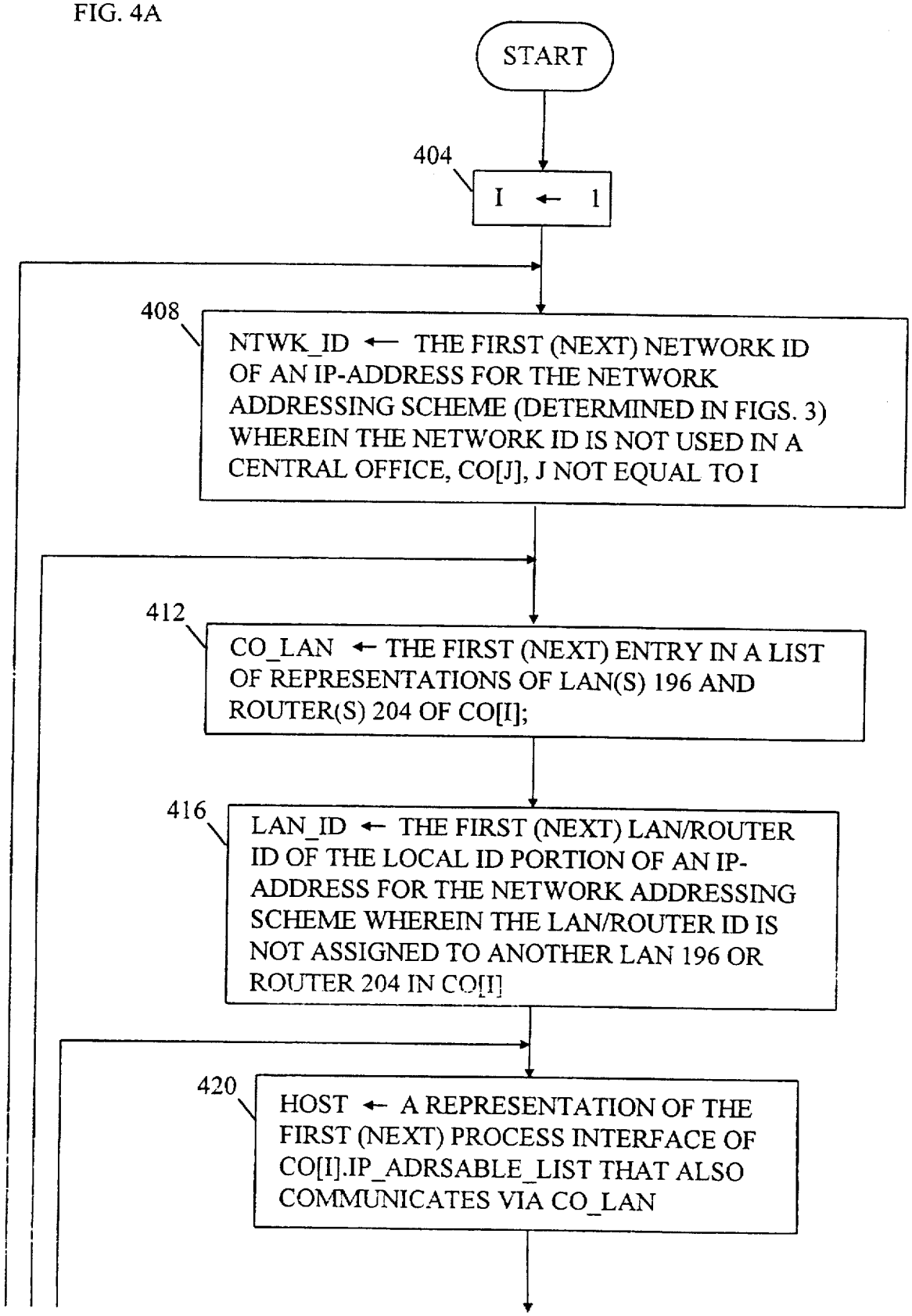
FIGS. 4A and 4B present a flowchart for assigning IP-addresses according to the scheme determined in FIGS. 3A and 3B.
Figure 4B:
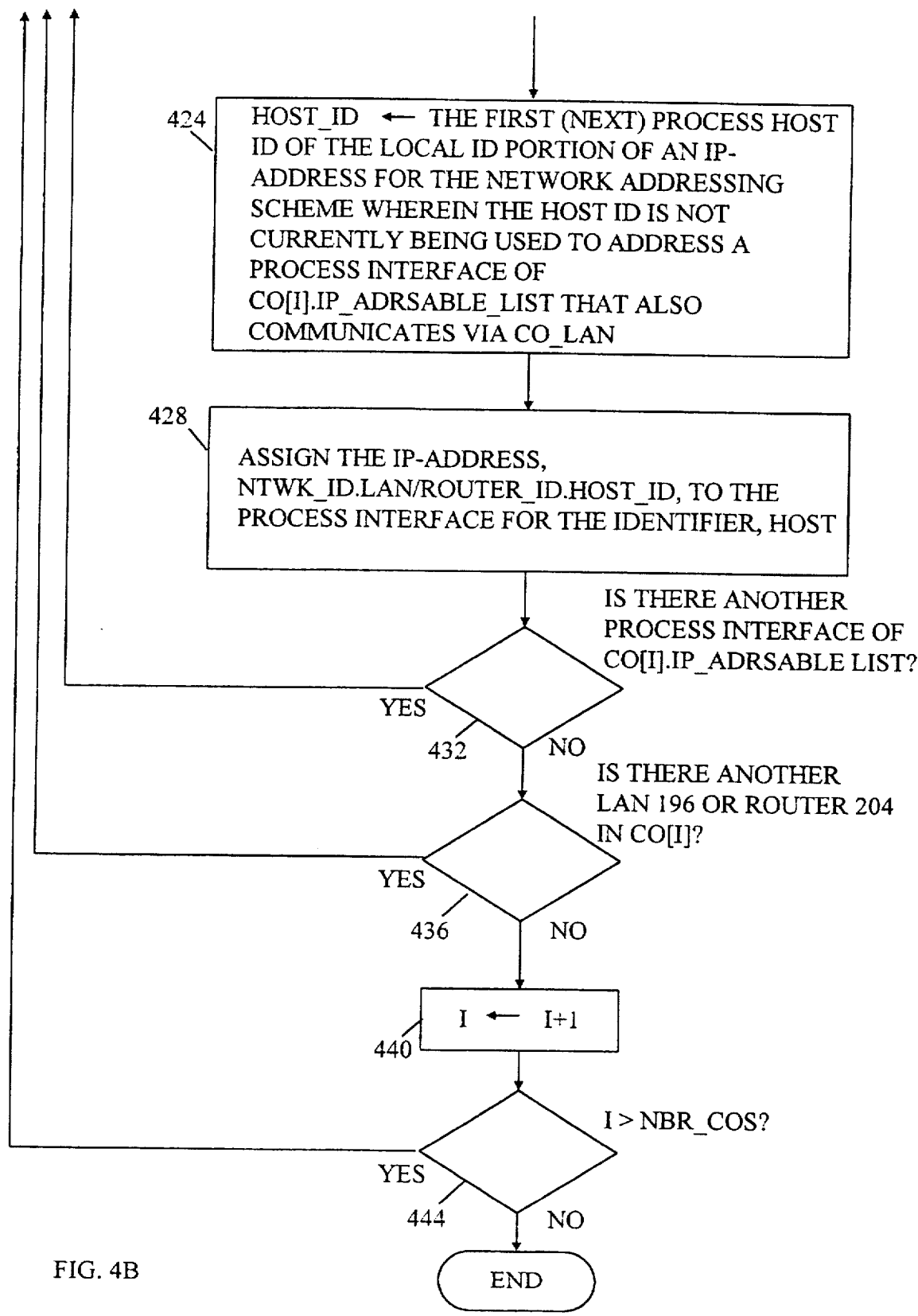

FIGS. 4A and 4B provide a flowchart for assigning IP-addresses according to the IP-address scheme determined in FIGS. 3A and 3B. In particular, the flowchart of FIGS. 4A and 4B assign IP-addresses to the IP-addressable process interfaces of all central offices 120, the central offices being represented by an array, CO, having entries, CO[I], I=1,2, . . . ,NBR_COS. Accordingly, in step 404 the identifier, I, for indexing the list or array of central offices 120 is set to 1 so that process interfaces from the first central office 120 will have its IP-addressable process interfaces assigned IP-addresses. Subsequently, in step 408 the identifier, NTWK_ID, is assigned the first value (i.e., numerically smallest modolo certain reserved values) for the network ID portion of an IP-address for the network IP-addressing scheme determined in FIGS. 3A and 3B. Following this, in step 412 the identifier, CO_LAN, is assigned the first entry in a list of representations of the LAN hub(s) 196 and the router(s) 204 of the first central office 120 (i.e., CO[1]). Subsequently, in step 416 the identifier, LAN_ID, is assigned the first value (i.e., numerically smallest modolo certain reserved values) for the LAN/router ID portion of an IP-address for the network addressing scheme determined in FIGS. 3A and 3B. Next, in step 420, the identifier, HOST, is assigned a representation of the first process interface addressable solely using an IP-address (i.e., the first representation of a process interface in the list, CO[I].IP_ADRSABLE_LIST), wherein the process interface for this first representation also communicates with the device represented by the identifier CO_LAN. Following this, in step 424 the identifier, HOST_ID, is assigned the first value (i.e., numerically smallest) for the host ID portion of the local ID portion of an IP-address (for the network addressing scheme of FIGS. 3). Subsequently, in step 428 the (doted notation) IP-address, NTWK_ID.LAN_ID.HOST_ID, is assigned to the process interface represented by the identifier HOST. Thus, if for example: (a) the NTWK_ID is 172.16, (b) the LAN_ID is 40, and (c) the HOST_ID is 32, then the resulting IP-address for the process interface identified by HOST is 172.16.40.32.

The remaining steps of the flowchart of FIGS. 4A and 4B (i.e., steps 432 through 444) provide for iterations on the above-discussed steps 408 through 428. In particular, in step 432, a determination is made as to whether there is another IP addressable process interface in the current central office 120 (i.e., CO [I]) wherein: (a) this process interface is to be solely addressed (i.e. addressable) by an IP-address, (b) the process interface communicates with the device identified by CO_LAN, and (c) the process interface has not been assigned an IP-address. If all these conditions are true, then the affirmative branch from this step is followed and steps 420 through 428 are again executed. Thus, in step 420, the next representation of a process interface in the list, CO[I] .IP_ADRSABLE_LIST, is assigned to the identifier, HOST, wherein the represented process interface communicates with, for example, the WAN 124 via the device for CO_LAN and wherein this process interface has not yet been assigned an IP-address. Subsequently, in step 424 the identifier, HOST_ID, is assigned the next (value in numerically ascending order for the) host ID portion of the local ID portion of an IP-address, wherein the host ID is not currently being used to address an IP-addressable process interface that also communicates via the device represented by CO_LAN. Thus, in step 428 a new IP-address is determined and assigned to the process interface identified by HOST.

Alternatively, if in step 432 at least one of the conditions on this step is not satisfied, then for the device represented by CO_LAN there is not another IP-addressable process interface (communicating via this device) to which an IP-address must be assigned. Therefore, step 436 is encountered wherein the determination is made as to whether there is another LAN hub 196 or router 204 contained in the central office 120 that communicates with IP-addressable process interfaces that do not currently have assigned IP-addresses. If so, then step 412 is again encountered wherein a representation of the next device (i.e., a LAN hub 196 or router 204) of the current central office 120 such that the process interfaces communicating via this next device have not yet had IP-addresses assigned to them. Subsequently, in step 416, the next value (in numerically ascending order modolo certain reserved values) for the LAN/router ID portion of the local ID portion of an IP-address is assigned to the identifier LAN_ID. Subsequently, steps 420 and 424 are performed wherein a representation of the first IP-addressable process interface that also communicates via the device for CO_LAN and the first value for the host ID, respectively, are assigned to the identifiers HOST and HOST_ID. Subsequently, in step 428, an IP-address is assigned to the process interface for HOST.

It is important to note that for each step of the present flowchart wherein the phrase, "FIRST (NEXT)", appears, it is intended to be interpreted as follows: if the flow of control for entering a step having this phrase is not from the first immediately preceding arrow that loops back from a step further down in the flowchart, (i.e. the flow of control is from the step just above where this loop back arrow points) then the "FIRST" option of the phrase is performed. Alternatively, if the flow of control is via this loop back arrow then the "NEXT" option is performed.

Returning now to step 436, if there are no further LAN hub(s) 196 and router(s) 204 communicating with IP-addressable process interfaces to which IP-addresses are to be assigned, then step 440 is encountered wherein the central office 120 index, I, is incremented and subsequently in step 444 a determination is made as to whether there are further central offices 120 whose process interfaces require IP-addresses assigned to them. If so, then step 408 and all subsequent steps are (potentially iteratively) performed until each process interface that is to be solely addressable by an IP-address in this next central office 120 is assigned an IP-address.

Alternatively, if in step 444 it is determined that all central offices 120 have had IP-addresses assigned to their IP-addressable process interfaces (i.e., I>NBR_COS), then the flowchart terminates. Note that similar flowcharts may be provided for assigning IP-addresses to IP-addressable process interfaces within each of the public telephone network control center 128, the data center(s) 130, and the centralized security center(s) 140.

Figure 5A:
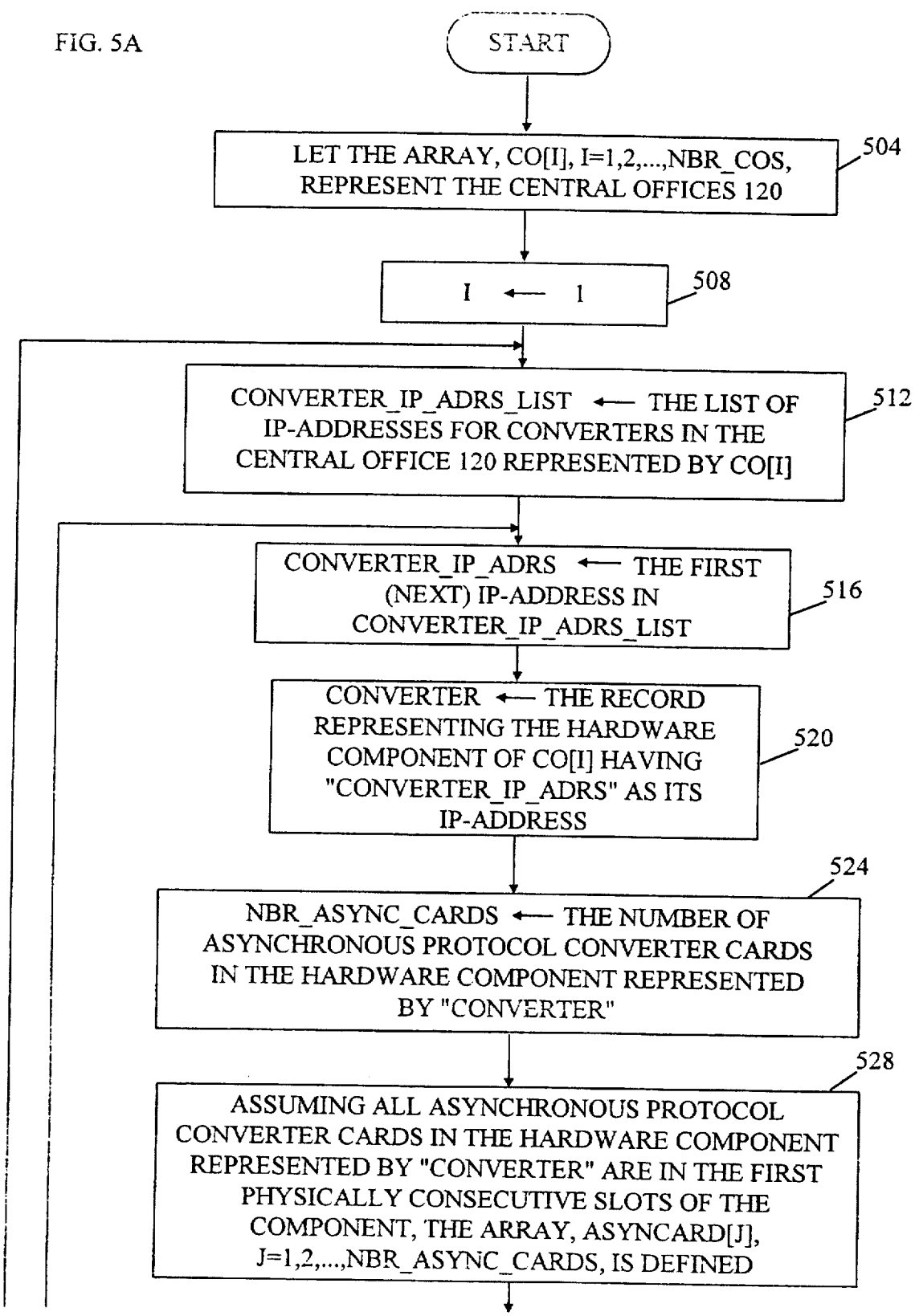
Figure 5C:
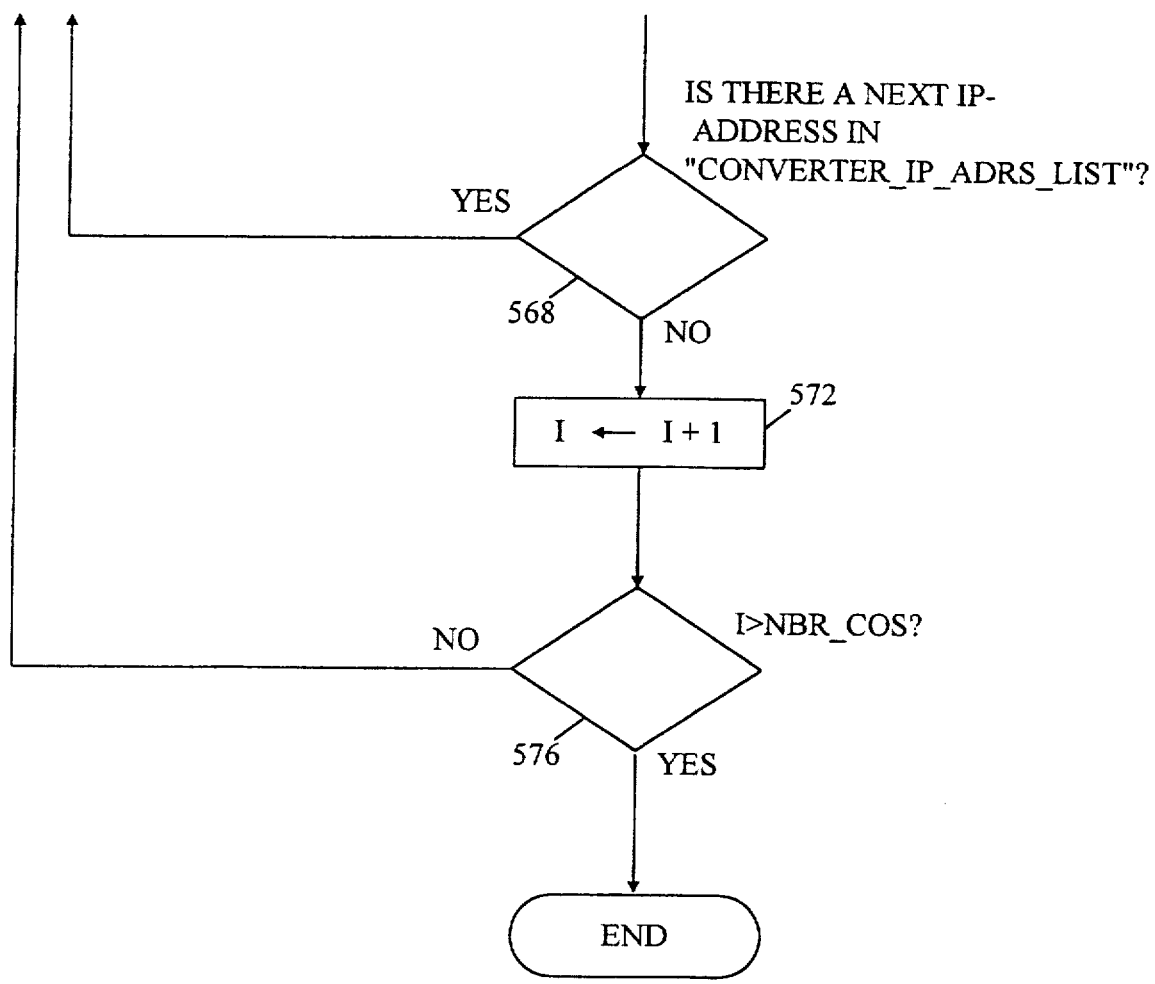

Referring now to the flowchart of FIGS. 5A, 5B and 5C, wherein a program is described for assigning to asynchronous process interfaces at central offices 120 IP-addresses extended with additional addressing information. In particular, the process interfaces assigned addressing information here are assumed to communicate asynchronously with other nodes of, for example, the wide area network 124 via another component (hereinafter known as a converter) of the central office wherein this converter serves at least as a gateway to one or more such asynchronous process interfaces and wherein this converter has already had an IP-address address assigned to it via, for example, the flowchart of FIGS. 3A and 3B. In the configuration of central offices 120, such converters convert between asynchronous protocols utilized by the asynchronous process interfaces and the IP protocols utilized by, for example, the LAN hub 196. For example, the mediation device 200 and the synchronous cluster controller 66 can be considered converters.

More particularly, note that the flowchart of FIGS. 5 is intended to assign an extended IP-address to each asynchronous process interface having an asynchronous socket connection to the converter that serves as a gateway for the process interface. Thus, since it is assumed that there are no intermediate addressable processes between each such asynchronous process interface and its asynchronous socket, the extended IP-address can equally well be thought of as the extended IP-address for the asynchronous socket of the converter.

It is an important aspect of the present invention that the additional addressing information used in providing an extended IP-address also encodes characteristics of the communication path to the asynchronous process interface to which the extended address is assigned. In particular, assuming there are one or more asynchronous process interfaces at a central office 120, it is further assumed that there are one or more asynchronous cards provided within at least one converter, the cards having the asynchronous sockets for the asynchronous process interfaces. Further, the extended addressing information encodes, for each asynchronous process interface, the location of the asynchronous card and the socket on the card through which the process interface communicates. For example, since each converter is assumed to have such (any) asynchronous cards in its first initial sequence of ordered card slots, the additional addressing information for an asynchronous process interface encodes the position or location of the asynchronous card as well as the location of the asynchronous socket on the card communicating with the asynchronous process interface. Thus, in the event of a communication breakdown between such an asynchronous process interface and, for example, another process on a different node of the wide area network 124, then it is relatively easy for a technician in the central office having the asynchronous process interface to determine not only the converter being used to communicate with the asynchronous process interface but also the card and the socket within the card that is being used as the gateway to the asynchronous process interface. Thus, the technician may easily determine such hardware components if replacement is desired.

Commencing now with a step-by-step description of the flowchart, in step 504 the array having entries CO[I], I=1,2, . . . ,NBR_COS represents the central offices 120 for the telephony provider utilizing the present invention (each entry representing a single central office). In step 508, the indexing identifier, I, for indexing records related to each central office 120 is assigned the value 1 to indicate that the first central office 120 of the array, CO, is to have its addressable asynchronous process interfaces assigned addresses. Subsequently, in step 512 the identifier, CONVERTER_IP_ADRS_LIST, is assigned the list of all IP-addresses for converters in the central office 120 represented by CO[I]. Assuming that there is at least one such converter in each central office 120, in step 516 the identifier, CONVERTER_IP_ADRS, is assigned the first IP-address in CONVERTER_IP_ADRS_LIST. Further note that this step is the beginning of a loop wherein the identifier, CONVERTER_IP_ADRS, is iteratively assigned the next successive IP-address in CONVERTER_IP_ADRS_LIST. Accordingly, as in previous figures, the descriptive options "FIRST (NEXT)" should be interpreted such that if the flow of control for entering a step having this phrase is not from the first immediately preceding arrow that loops back from a step further down in the flowchart (i.e., flow of control is from the step just above where the loop back arrow points), then the "FIRST" option of the phrase is performed. Alternatively, if the flow of control is via this loop back arrow then the "NEXT" option is performed. Thus, in step 516 the first IP-address is assigned to CONVERTER_IP_ADRS when the flow of control is from step 512 to the present step (516), and whenever the immediately previous step performed is further down in the flowchart and a looping back is performed to the present step, then the next IP-address in CONVERTER_IP_ADRS_LIST that has not been used to determine an extended IP-address for an asynchronous process interface is assigned to CONVERTER_IP_ADRS.

Subsequent to step 516, step 520 is encountered wherein the identifier, CONVERTER, is assigned a record representing the hardware component of the current central office 120 having CONVERTER_IP_ADRS as its IP-address. Following this step, in step 524, the identifier, NBR_ASYNC_CARDS, is assigned the number of asynchronous protocol converter cards in the hardware component represented by CONVERTER. Subsequently, in step 528 an array, ASYNCARD, having elements, ASYNCARD[J], J=1,2, . . . ,NBR_ASYNC_CARDS, is defined wherein each array entry represents one of the asynchronous protocol converter cards and the array entries are in the same order as the asynchronous cards are in the slots of the hardware component represented by CONVERTER. Next, in step 532 as preparation for iterating through the asynchronous sockets on each of the asynchronous cards corresponding to an entry of ASYNCARD, J is initialized to 1. Subsequently, in step 536 the identifier, NBR_SOCKETS, is assigned the number of sockets supported by the asynchronous card represented by ASYNCARD[J]. Next, in step 540, an array, SOCKET, is defined whose entries, SOCKET[K], K=1,2, . . . , NBR_SOCKETS, represent the physical socket ports on the asynchronous card represented by ASYNCARD[J] wherein the entries in the array, SOCKET, are in the same order as the physical socket ports are on this card. Subsequently, in step 544 the index identifier, K, is initialized to 1 in preparation for the subsequent loop wherein the socket ports represented currently by the array, SOCKET, are assigned extended IP-addresses. Thus, in step 548 the additional addressing information to be added to an IP-address is computed and assigned to the identifier, SOCKET_ADRS. That is, a socket addressing scheme is provided wherein each asynchronous card in the converter has socket addresses above 10,000 (and as will be described further below, less than 11,000). Thus, assuming that there are less than 100 asynchronous sockets per asynchronous card, a unique socket address may be assigned to each socket on each of the asynchronous cards in the converter (up to nine asynchronous cards before the number 11,000 is reached which, in the present addressing scheme, is indicative of synchronous process interfaces as will be detailed further below). Subsequently, in step 552 an extended IP-address is assigned to the process interface of CO[I].SOCKET_ADRSABLE_LIST (determined in the flowchart of FIGS. 3), wherein this process interface communicates with the socket represented by SOCKET[K]. Specifically, the extended IP-address is obtained by concatenating the IP-address, CONVERTER_IP_ADRS, with the value of SOCKET_ADRS. Subsequently, in step 556, K is incremented by 1 so that any next socket on the asynchronous card represented by ASYNCARD[J] may have its communicating process interface assigned an extended IP-address. Thus, in step 560 a determination is made as to whether all sockets on the present asynchronous card have been examined. If not, then step 548 is again encountered for determining a new extended IP-address for another asynchronous process interface. Alternatively, if in step 560 all such sockets have been examined, then in step 562 the identifier, J, is incremented so that the next (if any) asynchronous card is examined in assigning extended IP-addresses to the process interfaces. Subsequently, in step 564 a determination is made as to whether all asynchronous cards in the converter have had their sockets examined. If this is not the case, then step 536 is again encountered and the asynchronous process interfaces communicating with the sockets of this next card are assigned extended IP-addresses. Alternatively, if in step 564 it is determined that all asynchronous cards have been examined for assigning extended IP-addresses to process interfaces communicating with an asynchronous card, then step 568 is encountered wherein a determination is made as to whether there is a next IP-address on the list, CONVERTER_IP_ADRS_LIST, corresponding to a next converter to have its communicating asynchronous process interfaces assigned an extended IP-address. If so, then step 516 is again encountered for assigning extended addresses to the asynchronous process interfaces communicating with this next converter. Alternatively, if there are no further converters for the present central office 130, then step 572 is encountered wherein the index, I, indicating the central office 120 whose process interfaces are currently being assigned addresses is incremented. Subsequently, in step 576 a determination is made as to whether all central offices 120 have assigned extended IP-addresses to all desired asynchronous process interfaces included in the central offices. If not, then step 512 is again encountered to assign extended IP-addresses to asynchronous process interfaces in the next central office. Alternatively, if all central offices have been examined for the assignment of extended IP-addresses to asynchronous process interfaces, then the present flowchart terminates.

Figure 6A:
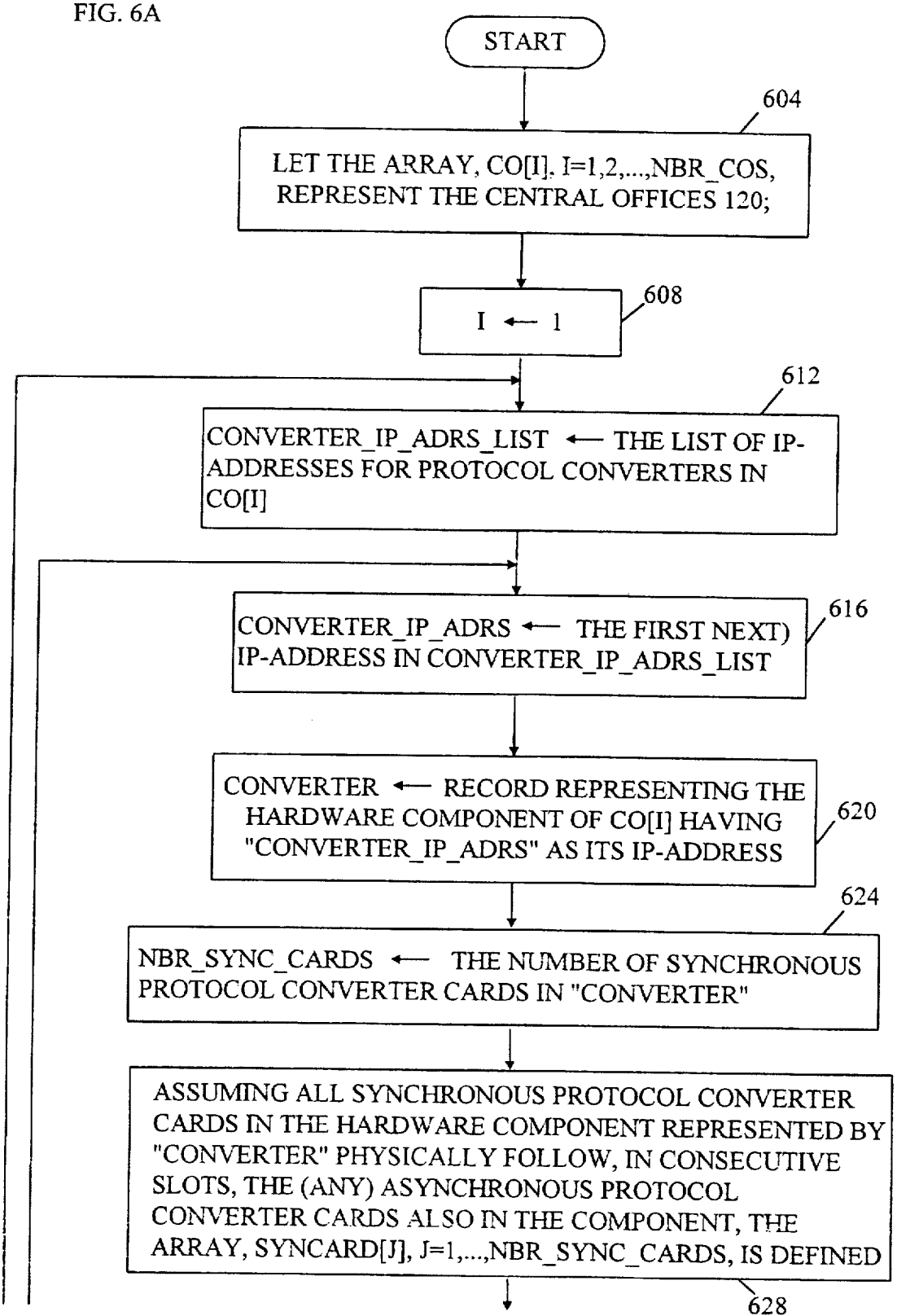
FIGS. 6A, 6B and 6C present a flowchart for assigning network addresses to synchronous process interfaces at central offices.
Figure 6B:
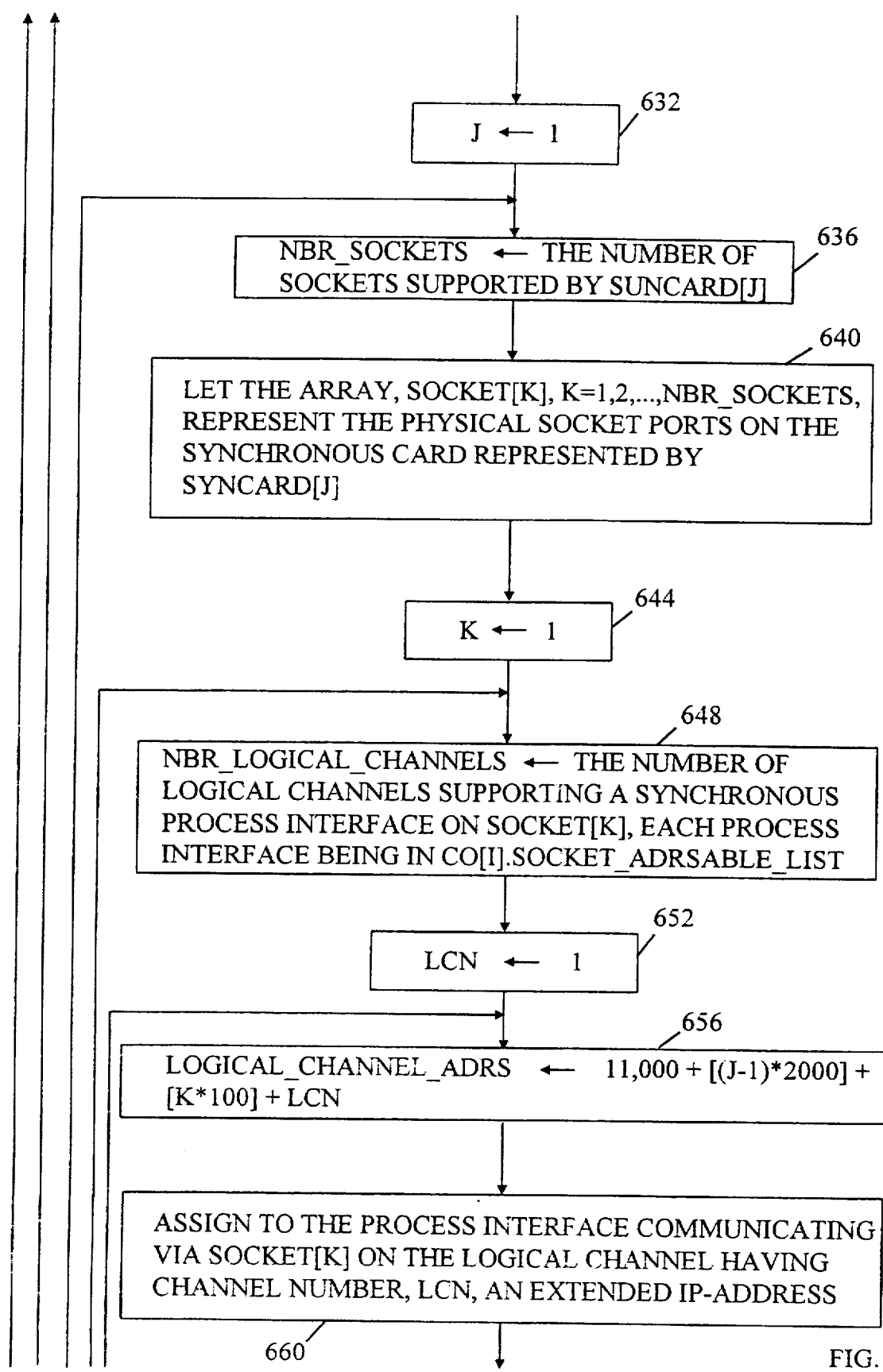
Figure 6C:
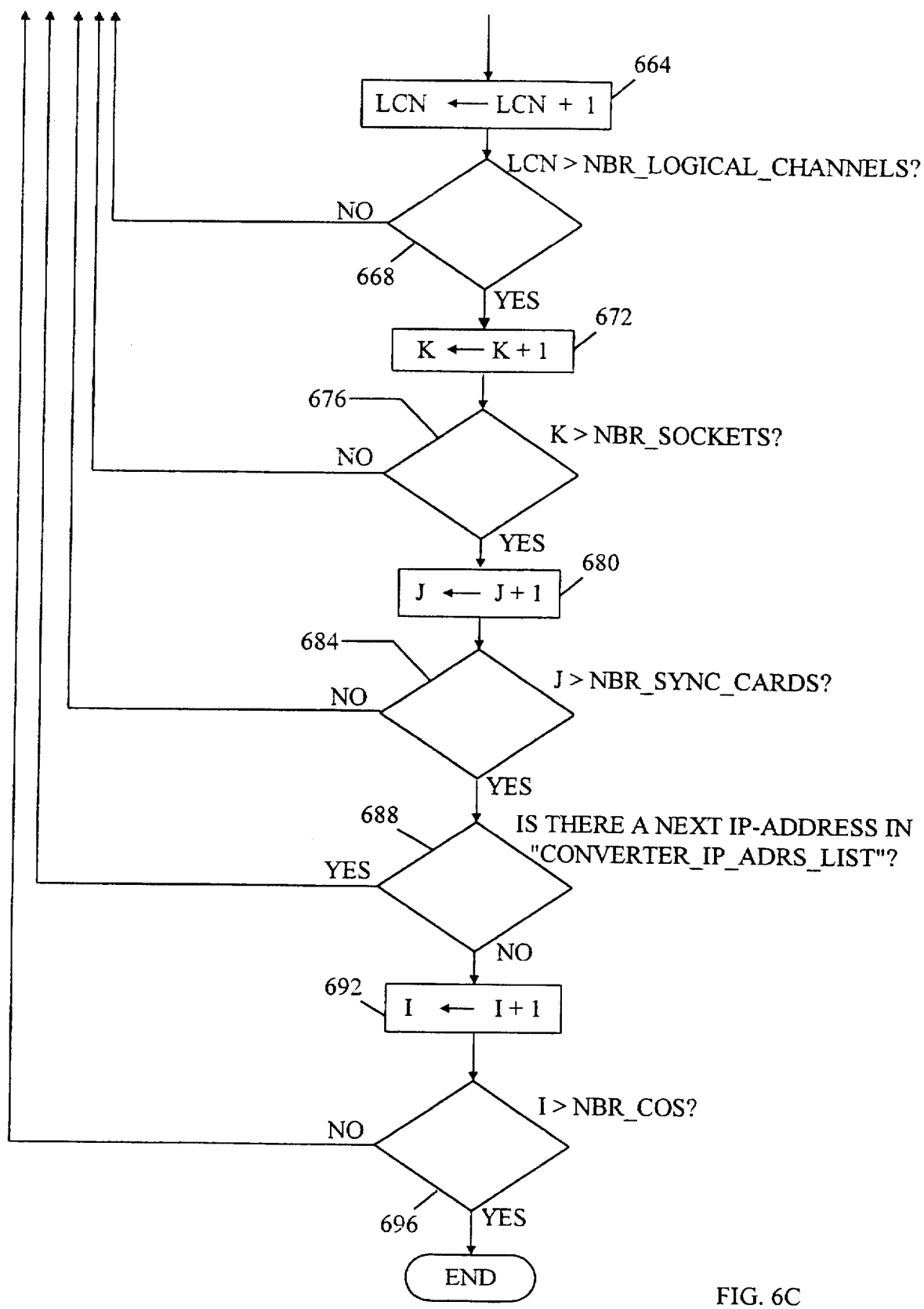
Figure 7A:
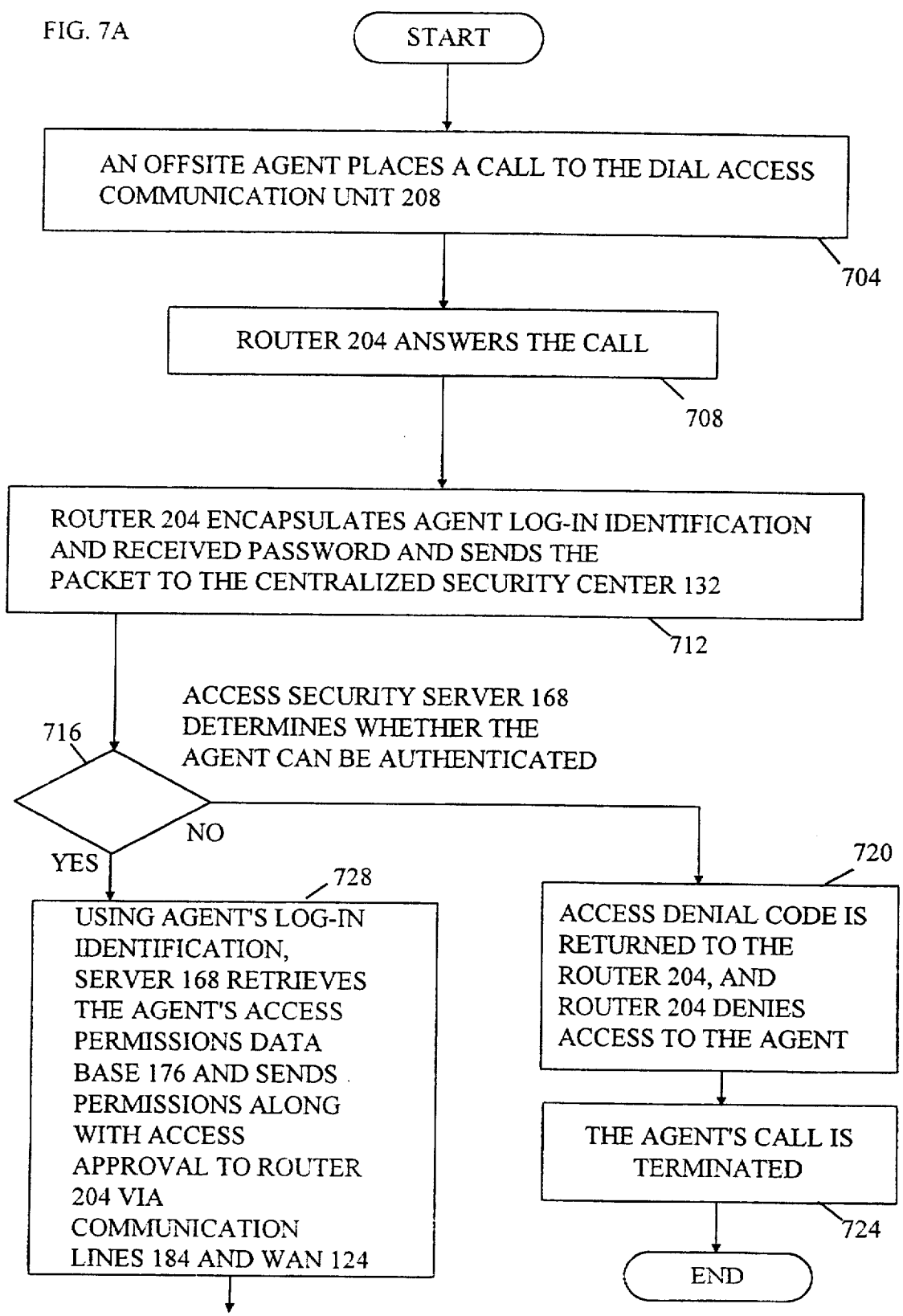
FIGS. 7A, 7B, 7C and 7D provide a high level flowchart of the steps for accessing a central office communication port from an off-site processing unit 72.
Figure 7B:
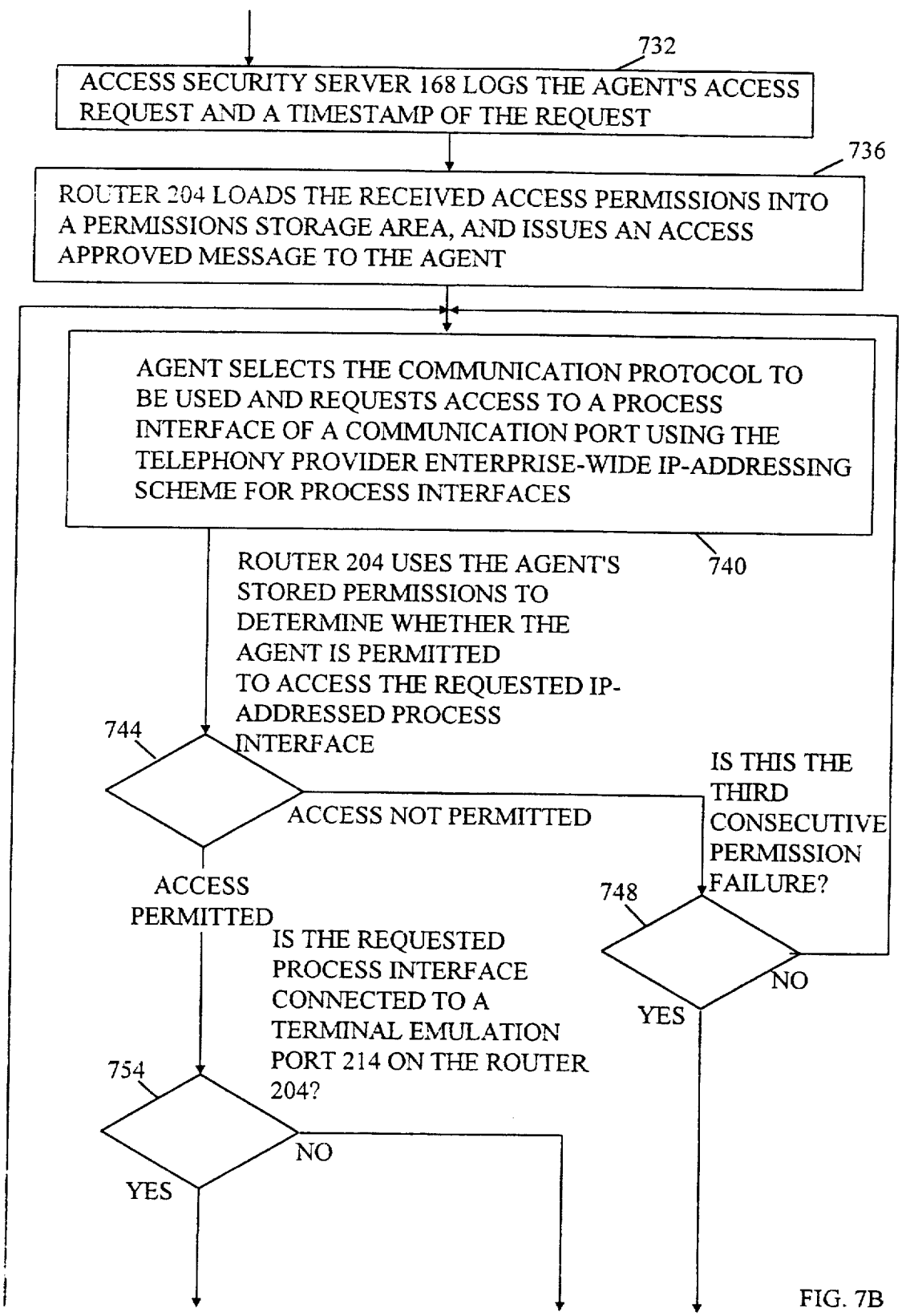
Figure 7C:
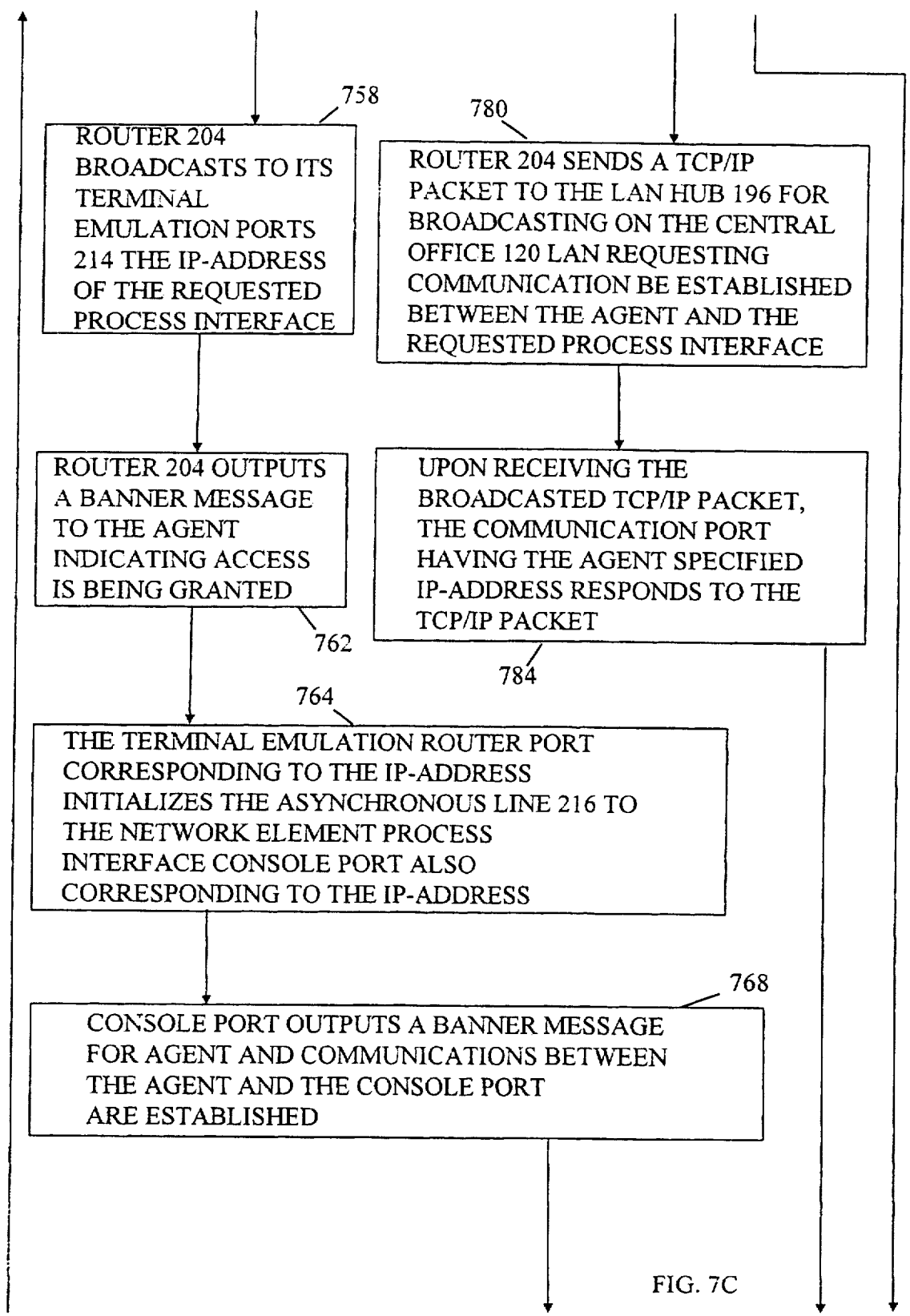
Figure 7D:
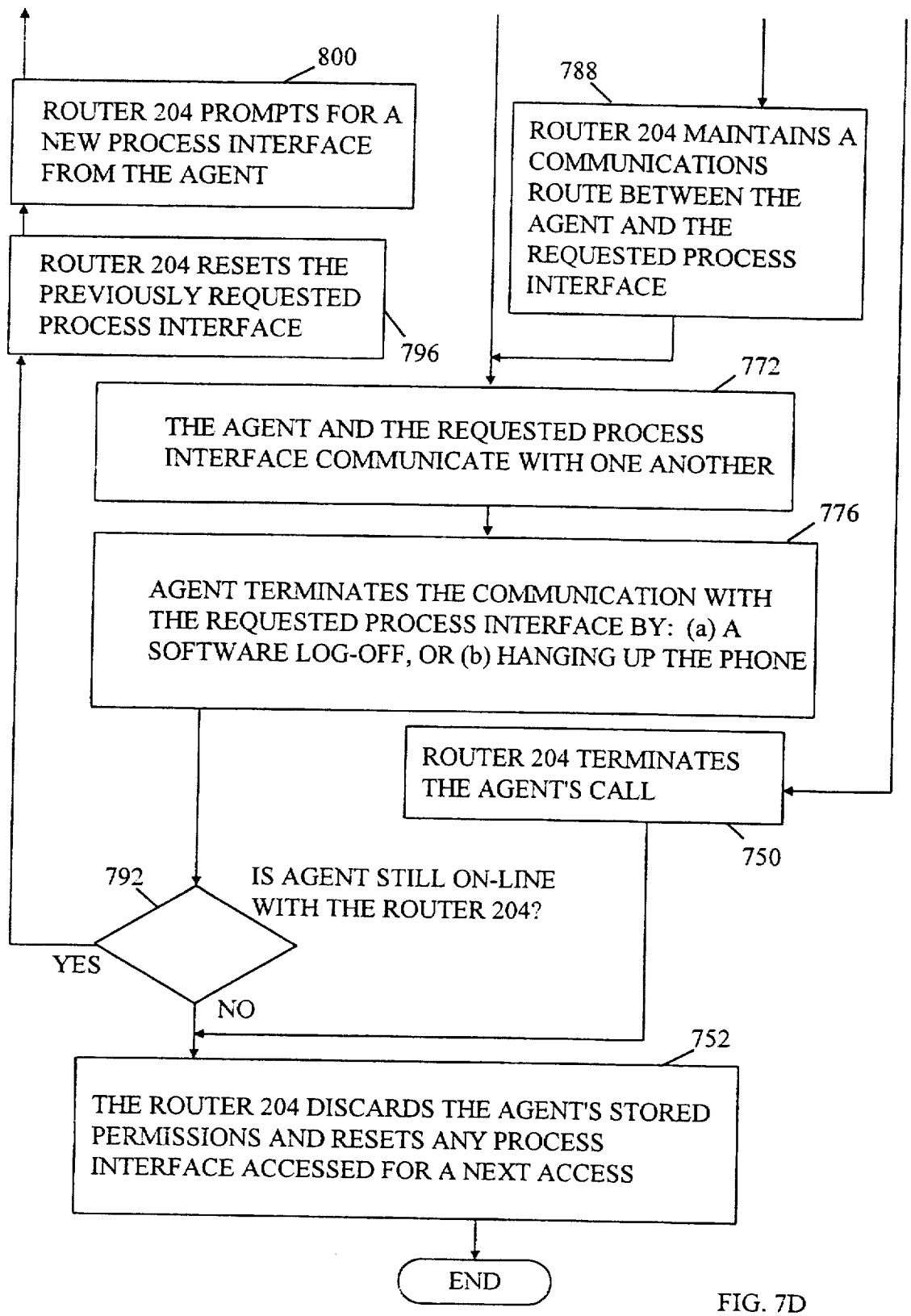

Referring now to the flowchart of FIGS. 6A, 6B, and 6C, a program is described for assigning to synchronous process interfaces at central offices 120 IP-addresses extended with additional addressing information. In particular, as with the asynchronous process interfaces extended IP-addresses in the flowchart of FIGS. 5, FIGS. 6 provide a similar extended IP-addressing scheme for synchronous process interfaces.

Thus, the synchronous process interfaces assigned additional addressing information here are assumed to communicate synchronously with other nodes of, for example, the wide area network 124 via another component or converter of the central office wherein this converter serves as a gateway to one or more such synchronous process interfaces, and wherein this converter also has already had an IP-address assigned to it via, for example, the flowchart of FIGS. 3. More particularly, referring to the configuration of a central office 120, such converters are used to convert between synchronous protocols utilized by the synchronous interfaces and the IP protocols utilized by, for example, the LAN hub 196. For example, the mediation device 200 and the synchronous cluster controller 66 can be considered as such converters. Further note that as with the asynchronous process interfaces provided with extended IP-addresses according to the flowchart of FIGS. 5, the flowchart of FIGS. 6 is intended also to assign an extended IP-address to each synchronous process interface having a synchronous socket connection to the converter that serves as a gateway for the process interface. Accordingly, as with the addressed asynchronous process interfaces, since it is assumed also here that there are no intermediate addressable processes between each such synchronous process interface and its synchronous socket, the extended IP-addresses to be assigned here can also equally well be thought of as the extended IP-address for the synchronous socket of the converter.

Also note that the addressing information used to extend IP-addresses for synchronous process interfaces also encodes characteristics of the communication path to the synchronous process interface in a manner similar to the encoding of characteristics of the communication path for the asynchronous process interfaces as provided in the flowchart of FIGS. 5. In particular, assuming there are one or more synchronous process interfaces at each central office 120, it is further assumed that there are one or more synchronous cards provided within at least one converter, the cards having the synchronous sockets for the synchronous process interfaces. Further, the extended addressing information encodes, for each synchronous process interface, the location of the synchronous card and the socket on the card through which the synchronous process communicates. For example, since each converter is assumed to have such (any) synchronous cards in sequentially ordered card slots after any asynchronous cards, the extended addressing information for a synchronous process interface encodes the position of the synchronous card as well as the location of the synchronous socket on the card communicating with the synchronous process interface. Thus, in the event of a communication breakdown between such a synchronous process interface and, for example, another process, it is relatively easy for a technician in the central office having the synchronous process interface to determine not only the converter being used to communicate with the synchronous process interface but also the card and the socket within the card that is being used as the gateway to the synchronous process interface. Thus, the technician may easily determine such hardware components if replacement is desired.

In describing the steps and flow of control of FIGS. 6, note that the general strategy and structure of FIGS. 6 is substantially similar to FIGS. 5. In fact, steps 604 through 644 correspond one-to-one with steps 504 through 544 of FIGS. 5, the only difference being that FIGS. 5 reference asynchronous process interfaces whereas FIGS. 6 represent synchronous process interfaces. Further, steps 672 through 696 correspond one-to-one with steps 556 through 576 of FIGS. 5. There is, however, a different extended addressing calculation provided in the steps 648 through 668 of FIGS. 6 than the extended addressing calculation in FIGS. 5. The different calculation used in FIGS. 6 is substantially due to the fact that each synchronous socket of a converter can communicate with a number of synchronous process interfaces by appropriately multiplexing them. Accordingly, for a given synchronous socket, the synchronous process interfaces communicating with this socket communicate via "logical channels" wherein each such logical channel is identified uniquely by a "logical channel number". Thus, additional addressing information (to be used with an IP-address) for addressing a synchronous process interface not only includes the terms of step 548 (FIGS. 5), i.e., an offset (e.g. the number 10,000), a card slot offset (e.g. the term J×100) and a socket location identifier (e.g. the value K), but also a logical channel number as well.

Given the above discussion regarding FIGS. 6, it is assumed that one skilled in the art will find the flowchart of FIGS. 6 straightforward to follow. However, for completeness steps 648 through 668 will now be briefly discussed.

Upon entering step 648, a current central office 120 (represented by CO[I]) has been selected, a current converter (represented by the identifier, CONVERTER) has already been provided with an IP-address, a synchronous card (represented by SYNCARD[J]) within the converter has been determined, and a first socket (represented by SOCKET[K]) on the synchronous card, SYNCARD[J] has been selected wherein K=1. Thus, in step 648 the identifier, NBR_LOGICAL_CHANNELS is assigned the number of logical channels supported by the socket represented by SOCKET[K]. Subsequently, in step 652 assuming there is at least one logical channel number for this socket, the identifier, LCN, is assigned the value 1 in preparation for the loop corresponding to steps 656 through 668. Subsequently, in step 656, the calculation for the additional addressing information is performed and assigned to the identifier LOGICAL_CHANNEL_ADRS. In this computation, an offset of 11,000 is used so as to not interfere with any asynchronous process interface extended addressing, such asynchronous addressing being between 10,000 and 1,000. Additionally, the term, (J−1)*2,000 is used as an offset to uniquely identify the $J^{th}$ synchronous card in the hardware component currently identified by the identifier CONVERTER. Further, the term, K* 100, provides an encoding within the additional addressing information for designating the socket within the synchronous card for communicating with the synchronous process interface to be assigned this additional addressing information, and the identifier, LCN, is provided to uniquely determine the logical channel number for this synchronous process interface. As an example, the number 11,101 refers to the first logical channel on the first socket of the first synchronous card of the converter. Moreover, the number 15,305 refers to the fifth logical channel on the third socket of the third synchronous card for the converter.

Subsequently, in step 660 an extended IP-address is determined for the synchronous process interface that communicates with the current converter on a logical channel number, LCN, on the $K^{th}$ socket of the $J^{th}$ synchronous card of the converter. In particular, the converter's IP-address, CONVERTER_IP_ADRS, is concatenated with the value for the identifier LOGICAL_CHANNEL_ADRS. Following this step, in step 664, the identifier, LCN is incremented by one and subsequently in step 668, a determination is made as to whether all logical channel numbers supporting a synchronous process interface on the current socket have been assigned extended IP-addresses. If not, then step 656 is a gain encountered to compute another extended IP-address for the next synchronous process interface to be assigned an extended address. Alternatively, if in step 668 there are no further synchronous process interfaces that communicate with the current socket via a logical channel number then the remaining steps 672 through 696 are performed in a manner identical to the steps 556 through 576 of FIGS. 5 with the exception that instead of providing a test regarding the number of asynchronous cards (e.g. using the identifier, NBR_ASYNC_CARDS) as in step 564, step 684 uses the identifier, NBR_SYNC_CARDS, to denote the number of synchronous cards.

FIGS. 7A–D provides a high level flowchart of a particularly important aspect of the present invention wherein the flowchart provides a program for accessing process interface on a communication port (e.g., a network element 48 communication port) within a central office 120 from an off-site processing unit 72, wherein the access is by an agent remote from the central office 120. In particular, this flowchart illustrates the processing that is performed for providing better assurance that there is a reduced possibility of breaches in the security for accessing the central office 120. Thus, in step 704 of FIG. 7A a remotely located agent places a call, via an off-site processing unit 72, to the dial access communication unit 208 of a central office 120. In response, the router 204, in step 708, is alerted and answers the call by prompting the agent for a login identification and the current password obtained from the transportable password assignment unit 224 presumably in the agent's possession. Assuming the agent supplies a login identification and password, in step 712 the router 204 encapsulates these two data items in a TCP/IP packet and sends them to the centralized security center 132 via communication lines 184a,d and wide area network 124. Subsequently, the login identification and password are routed to the access security server 168 for determining whether the agent's identity can be authenticated. This is accomplished by first determining if the login identification is valid and if valid, then secondly determining if the received password is currently valid for allowing access to the central office 120. If there is a negative answer to either determination, then step 720 is performed wherein the access security server 168 sends (via communication lines 184d, wide area network 124, communication line 184a, and router 204) an access denial code indicating that the present agent is not authorized to access any further components of the central office 120. Thus, in step 724 the router 204 terminates the agent's call.

Alternatively, if in step 716 the agent's identification and password are authenticated, then in step 728 the access security server 168 retrieves the agent's access permissions from the access permissions database 176 and sends these permissions along with an access approval code to the router 204. Following this, in step 732 the access security server 168 writes an entry to a access request log (not shown) specifying the agent requesting access, the central office 120 to which access was requested and a timestamp indicating the time the request for access was granted. Subsequently, in step 736, once the router 204 receives the agent's authentication approval, the router loads the agent's process interface access permissions for communication ports into its permission storage area (not shown) and then issues an access approved message to the agent. Note that at least regarding network element process interface access, it is particularly important that agents are only granted permission to access certain predetermined network elements 48. Not only is this a security feature for the telephony provider of the central office 120, but also such restrictions on access are preferred by telephony network element vendors. That is, each vendor typically prefers that its network elements within a central office 120 are not accessible by technicians from a competitive vendor.

Subsequently, in step 740 the agent typically selects the transmission or communication protocol desired and requests access to a desired process interface by specifying the interface's assigned IP-address. In step 744 a determination is made as to whether the agent is permitted to access the process interface requested. Note that this determination is accomplished by comparing the IP-address of the requested process interface with the stored permissions in the router 204. In particular, note that the stored permissions preferably prohibit access to any process interface of telephony service provider that is outside the central office 120 being accessed by the agent. Accordingly, if the stored permissions in the router 204 do not grant access to the requested process interface, then in step 748 a determination is made as to whether this failure to grant permission is the third consecutive permission failure. If not, then step 740 is again performed wherein the agent may request access to a process interface. If however, three consecutive permission failures are detected, then in step 750 the router 204 terminates agent's call and in step 752 the router discards the agent's stored permissions. If, however, access to the requested process interface is granted in step 744, then in step 754 a determination is made as to whether the requested process interface is connected to one of the terminal emulation router ports 214 as well as the LAN hub 196. If so, then in step 758 the router 204 broadcasts the IP-address of the requested process interface to the router ports 214. Subsequently, in step 762 the router 204 outputs a banner message to the agent indicating that access to the requested process interface is being granted. At least potentially in parallel with steps 758 and 762, the step 764 is performed wherein the router terminal emulation port 214 connected to the requested process interface initializes the requested process interface by transmitting a synchronous initialization signals to the requested port via an asynchronous line 216. Note that, as discussed hereinabove, the process interfaces connected to the synchronous lines 216 are network elements 48 console ports. Therefore hereinafter the requested process interface is also referred to as the requested console port. Thus, although the initialization signals from the requested console port may be substantially network element specific, the steps for initializing such a console port are well known in the telephony art.

Subsequently, in step 768, if the requested console port is available and responsive to the initialization of step 764, then this console port responds with its own banner message which is also output to the agent indicating that the agent now has access to the console port. Following this, in step 772 the agent and the requested process interface communicate with one another until in step 776 the agent either terminates communication with this requested console port while retaining access to the router 204, or terminates the phone connection with the central office 120.

Alternatively, if in step 754 the requested process interface is not one of the router terminal emulation ports 214, then since all other agent addressable process interfaces must be accessed via LAN hub 196, step 780 is performed wherein the router 204 sends an initial TCP/IP packet to the LAN hub 196 including the packet's source IP-address and destination IP-address (as all TCP/IP packets include). That is, the TCP/IP packet includes both: (a) the address of the port on the router 204 to which the agent is connected via dial access communication unit 208, and (b) the IP-address of the requested process interface. Upon receiving the TCP/IP packet, the LAN hub 196 broadcasts this packet to all process interfaces connected to the LAN hub 196. Subsequently, in step 484, assuming the requested process interfaces is available, this interface responds to this initial router 204 TCP/IP packet, via LAN hub 196, with a TCP/IP packet indicating that communications with the requested interface may be established and this port also supplies a banner message to be output to the agent via another TCP/IP packet. Following this, in step 788 the router 204 maintains a communications route between the agent and the process interface via the LAN hub 196 in a conventional manner. Subsequently, steps 772 and 776 are performed as previously described. Thus, regardless of the control path taken from step 754, step 792 is performed wherein a determination is made as to whether the agent is still on-line with the router 204. If so, then steps 796 and 800 are performed, wherein the router 204 first resets the previously requested process interface (step 796), and then outputs a prompt to the agent for another process interface to which the agent may request access. Following this, step 740 is again encountered, wherein the agent may supply the necessary information for communicating with another process interface.

Returning now to step 792, eventually the agent will disconnect his/her off-site processing unit 72 from the asynchronous dial access lines 212 being used. In this case, step 752 is performed wherein the router 204 discards the agent's stored permissions as well as resets any previously accessed process interface requiring resetting. Note, however, that in the case where step 752 is performed subsequent to step 750, no process interface requires resetting. Following step 752, the flowchart ends and the router 204 reconfigures the modem within the dial access communication 208 that was used by the agent so that it can accept another agent.

The foregoing discussion of the invention has been presented for purposes of illustration and description. Further, the description is not intended to limit the invention to the form disclosed herein. Subsequently, variation and modification commiserate with the above teachings, within the skill and knowledge of the relevant art, are within the scope of the present invention. The embodiment described herein above is further intended to explain the best mode presently known of practicing the invention and to enable others skilled in the art to utilize the invention as such, or in other embodiments, and with the various modifications required by their particular application or uses of the invention. It is intended that the appended claims be construed to include alternative embodiments to the extent permitted by the prior art.

What is claimed is:

1. A method for managing communications with one or more telephony central offices comprising a network, comprising;

providing a local area network within each of said one or more telephony central offices;

determining a plurality of process interfaces within the local area network for each of said one or more telephony central offices, each said process interface being connected via its corresponding local area network to said network;

performing for each of said process interfaces the following steps (A1) through (A2):

(A1) identifying a corresponding set of hardware components wherein network communications with the process interface utilize a corresponding communication channel defined by said hardware components of said set;

(A2) assigning a corresponding network address for routing network communications to the process interface, wherein said corresponding network address comprises an encoded identification of each hardware component of said set of hardware components for the corresponding communication channel;

wherein each of said process interfaces is responsive to its corresponding network address when the corresponding network address is identified in network communications by the process interface; and providing one or more of said corresponding network addresses for communicating with one or more of said process interfaces on the network, wherein communications with any said one or more of said process interfaces are routed through the local area network corresponding with such process interface.

2. A method as claimed in claim 1, wherein said network is a wide area network using an Internet Protocol addressing scheme.

3. A method as claimed in claim 1, wherein for substantially every first and second process interface of said plurality of process interfaces, said set of hardware components for said first process interface is different from said set of hardware components for said second process interface.

4. A method as claimed in claim 1, wherein said step of identifying includes determining at least one of a communication card and a socket on said communication card as said hardware components of said set of hardware components.

5. A method as claimed in claim 1, wherein said step of assigning includes extending an Internet Protocol address with additional addressing information for encoding said set of hardware components.

6. A method as claimed in claim 1, further including a step of identifying a malfunction on the corresponding communication channel for a first network address using a location of the one or more hardware components in the corresponding set for the first network address.

7. A method as claimed in claim 1, wherein said step of determining includes selecting at least one process interface residing at a telephony data center.

8. A method as claimed in claim 1, wherein said step of performing includes a step of determining an addressing scheme for the plurality of process interfaces wherein each said process interface is assigned a different address from the addressing scheme.

9. A method as claimed in claim 1, wherein said step of performing includes a step of determining network addresses for assigning to the plurality of process interfaces, wherein for at least some of the process interfaces, each corresponding network address includes a network identification portion for identifying a corresponding geographical location.

10. A method as claimed in claim 9, wherein said network identification portions each include a corresponding identification of the corresponding telephony central office located at each of the corresponding geographical locations.

11. A method as claimed in claim 9, wherein said step of determining network addresses includes providing network communication routing portions for the network addresses having corresponding network identification portions, wherein for at least one of the process interfaces having a corresponding network address with a network communication routing portion, the corresponding network address has a particular one of the network communication routing portions such that the communication channel for the at least one process interface includes a routing device as one of the hardware components of the set of hardware components for the process interface, and the routing device is identified by the particular network communication routing portion.

12. A method as claimed in claim 11, wherein the routing device is one of a local area network hub and a router.

13. A method as claimed in claim 11, wherein the particular network communication routing portion has enough bits for uniquely identifying at least two routing devices at the corresponding telephony central office having the process interface.

14. A method as claimed in claim 9, wherein said step of determining network addresses includes establishing a predetermined maximal number of network addresses in a collection of network addresses, wherein each network address in the collection has a same value for the network identification portion and the network addresses in the collection are assignable to process interfaces at a single corresponding telephony central office.

15. A method as claimed in claim 14, wherein said predetermined maximal number is less than a total number of the process interfaces in the corresponding telephony central office.

16. A method as claimed in claim 11, wherein said step of determining network addresses includes providing host identification portions for the network addresses having both network identification portions and network communication routing portions, wherein for the at least one process interface, the corresponding network address has a particular one of the host identification portions that uniquely identifies the process interface when both the network identification portion and the particular network communication routing portion are provided for the process interface.

17. A method as claimed in claim 9, wherein said step of determining network addresses includes providing host identification portions for the network addresses wherein for at least one of the process interfaces having a corresponding network address with a host identification portion, the corresponding network address has a particular one of the host identification portions such that the communication channel for the process interface includes a converter as one of the hardware components of the set of hardware components for the process interface, and the converter is identified by the particular host identification portion.

18. A method as claimed in claim 17, wherein the converter translates between communication protocols.

19. A method as claimed in claim 17, wherein said step of determining network addresses includes providing address extension portions for the network addresses having host identification portions, wherein for the at least one process interface, the corresponding network address has a particular one of the address extension portions such that the communication channel for the process interface includes a communication card as one of the hardware components of the set of hardware components for the process interface, and the communication card is identified by the particular address extension portion.

20. A method as claimed in claim 19, wherein the communication card is included in the converter.

21. A method as claimed in claim 1, wherein said step of providing includes storing said network addresses, wherein said stored network addresses are accessible from the network.

22. A method as claimed in claim 21, wherein said step of storing includes associating access permissions with each of said corresponding network addresses.

23. A method as claimed in claim 1, wherein said local area network corresponding with at least one of the process interfaces utilizes an ethernet based protocol.

24. A method as claimed in claim 23, wherein said ethernet based protocol is one of TCP/IP, UDP/IP and OSI.

* * * * *

UNITED STATES PATENT AND TRADEMARK OFFICE
CERTIFICATE OF CORRECTION

PATENT NO. : 5,907,610
DATED : May 25, 1999
INVENTOR(S) : Arthur E. Onweller

It is certified that error appears in the above-identified patent and that said Letters Patent is hereby corrected as shown below:

In Column 1, line 56: delete "mprotocol" and insert -- protocol--
In Column 4, line 24: delete "finnelling" and insert -- funnelling--
In Column 4, line 65: delete "firther" and insert --further--
In Column 22, line 42: delete "1,000" and insert --11,000--

Signed and Sealed this

Twelfth Day of October, 1999

Attest:

Q. TODD DICKINSON

*Attesting Officer*    Acting Commissioner of Patents and Trademarks